US012693378B2

(12) United States Patent
Stapelbroek

(10) Patent No.: US 12,693,378 B2
(45) Date of Patent: Jul. 28, 2026

(54) INFORMATION PROCESSING APPARATUS AND SENSING METHOD

(71) Applicant: Asahi Kasei Microdevices Corporation, Tokyo (JP)

(72) Inventor: Willem Johan Stapelbroek, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 329 days.

(21) Appl. No.: 18/603,042

(22) Filed: Mar. 12, 2024

(65) Prior Publication Data

US 2024/0402291 A1      Dec. 5, 2024

(30) Foreign Application Priority Data

Jun. 5, 2023      (JP) ................................. 2023-092137

(51) Int. Cl.
  *G01S 7/35*          (2006.01)
  *G01S 13/58*         (2006.01)

(52) U.S. Cl.
  CPC .............. *G01S 7/354* (2013.01); *G01S 7/356* (2021.05); *G01S 13/584* (2013.01)

(58) Field of Classification Search
  CPC ......... G01S 7/354; G01S 7/356; G01S 13/584
  See application file for complete search history.

(56) References Cited

U.S. PATENT DOCUMENTS 12,117,371 B2 * 10/2024 Peng ......................... G01S 7/35
2008/0088498 A1 * 4/2008 Suzuki .................... G01S 13/42
                                                           342/90
(Continued)

FOREIGN PATENT DOCUMENTS

JP          2003315447 A      11/2003
JP          2010203918 A       9/2010
(Continued)

OTHER PUBLICATIONS

P. Delos et al., "Phased Array Antenna Patterns—Part 1: Linear Array Beam Characteristics and Array Factor," May 2020, https://www.analog.com/en/resources/analog-dialogue/articles/phased-array-antenna-patterns-part1.html (Year: 2020).*
(Continued)

*Primary Examiner* — William Kelleher
*Assistant Examiner* — Noah Yi Min Zhu

(57) ABSTRACT

An information processing apparatus which senses an object by using an FMCW radar, wherein the information processing apparatus comprises: a data processing unit acquiring an angle power spectrum by performing angle FFT on a received signal; an acquisition unit acquiring an angle peak bin indicating an angle with the object; an extraction unit extracting an output signal corresponding to the power spectrum signal; and a correction unit correcting a phase of the output signal in accordance with a bin number of the plurality of peak bins, wherein the data processing unit applies a window function higher in order than a rectangular window function when performing the angle FFT, and the correction unit corrects the phase of the output signal so that a phase difference to be added or subtracted is $(N-1)/2 \times \pi \times \sin(\theta(i))$ [rad] in accordance with the bin number of the angle peak bin.

20 Claims, 27 Drawing Sheets

400

(56)                    References Cited

U.S. PATENT DOCUMENTS

| | | | | |
|---|---|---|---|---|
| 2008/0258962 A1* | 10/2008 | Kai | H01Q 3/30 | 342/147 |
| 2011/0080314 A1* | 4/2011 | Wintermantel | H01Q 9/0407 | 342/147 |
| 2014/0058255 A1* | 2/2014 | Mase | G01S 13/56 | 600/430 |
| 2017/0254891 A1* | 9/2017 | Malinovskiy | G01S 13/34 | |
| 2018/0011170 A1* | 1/2018 | Rao | G01S 7/354 | |
| 2019/0242972 A1* | 8/2019 | Melzer | G01S 13/931 | |
| 2019/0265347 A1* | 8/2019 | Wintermantel | G01S 7/354 | |
| 2019/0391249 A1* | 12/2019 | Takeuchi | G01S 13/536 | |
| 2022/0107402 A1* | 4/2022 | Kishigami | G01S 13/583 | |
| 2022/0244349 A1* | 8/2022 | Wintermantel | G01S 7/354 | |
| 2022/0260702 A1* | 8/2022 | Vaishnav | G01S 13/584 | |
| 2023/0094118 A1* | 3/2023 | Subburaj | G01S 7/356 | 342/107 |
| 2023/0258767 A1* | 8/2023 | Nashimoto | G01S 13/584 | 342/17 |
| 2024/0310505 A1* | 9/2024 | Petrov | G01S 13/931 | |

FOREIGN PATENT DOCUMENTS

| | | | |
|---|---|---|---|
| JP | 2019174130 A | | 10/2019 |
| JP | 2020024185 A | * | 2/2020 |
| JP | 2021001735 A | * | 1/2021 |
| JP | 2021063633 A | | 4/2021 |
| JP | 7173735 B2 | * | 11/2022 |
| JP | 2022192005 A | | 12/2022 |
| JP | 2023026124 A | | 2/2023 |

OTHER PUBLICATIONS

P. M. McCormick, T. Higgins, S. D. Blunt and M. Rangaswamy, "Adaptive Receive Processing of Spatially Modulated Physical Radar Emissions," in IEEE Journal of Selected Topics in Signal Processing, vol. 9, No. 8, pp. 1415-1426, Dec. 2015, doi: 10.1109/JSTSP.2015.2467360. (Year: 2015).*

Yu, X., Cui, G., Piezzo, M. et al. Robust constrained waveform design for MIMO radar with uncertain steering vectors. EURASIP J. Adv. Signal Process. 2017, 2 (2017). https://doi.org/10.1186/s13634-016-0437-9 (Year: 2017).*

F. Yang, K. Qu, M. Hao, Q. Liu, X. Chen and F. Xu, "Practical Investigation of a MIMO Radar System for Small Drones Detection," 2019 International Radar Conference (RADAR), Toulon, France, 2019, pp. 1-5, doi: 10.1109/RADAR41533.2019.171348. (Year: 2019).*

Han et al., "Phase-Extraction Method With Multiple Frequencies of FMCW Radar for Human Body Motion Tracking", IEEE Microwave and Wireless Components Letters, vol. 30, No. 9, Aug. 4, 2020, pp. 927-930, DOI: 10.1109/LMWC.2020.3010262.

Hu et al., "A novel adaptive range-bin selection method for remote heart-rate measurement of an indoor moving person using mmwave FMCW radar", IEICE Communications Express, vol. 10, No. 5, Mar. 1, 2021, pp. 277-282, DOI: 10.1587/comex.2021XBL0032.

Choi et al., "Target Range Selection of FMCW Radar for Accurate Vital Information Extraction", IEEE Access, vol. 9, Dec. 7, 2020, pp. 1261-1270, DOI: 10.1109/ACCESS.2020.3043013.

Munoz-Ferreras et al., "Random Body Movement Mitigation for FMCW-Radar-Based Vital-Sign Monitoring", 2016 IEEE Topical Conference on Biomedical Wireless Technologies, Networks, and Sensing Systems, Apr. 4, 2016, pp. 22-24, DOI: 10.1109/BIOWIRELESS.2016.7445551.

Futatsumori et al., "Range-Resolution Evaluation of Optically-Connected 96 GHz Millimeter-Wave Radar Using 8 GHz Bandwidth Frequency-Modulated Continuous-Wave Signal", Proceedings of the 2016 IEICE General Conference, Mar. 16, 2021, p. 263.

* cited by examiner

400

```
for (i=0; i<FFTNR, i++) {
If ((x(i)>= x(i-1)) && (x(i)>= x(i+1)))
{
    y[i] = 1
}else{
    y[i] = 0
}
}
```

```
for (i=0; i<FFTNR, i++) {
If ((x(i)>= x(i-1)) && (x(i)>= x(i+1)))
{
    y[i] = 1
}else{
    y[i] = 0
}
}
```

DISTANCE FFT EXECUTION UNIT

WINDOW FUNCTION EXECUTION UNIT

ANGLE FFT EXECUTION UNIT

WINDOW FUNCTION EXECUTION UNIT

400

450

INFORMATION PROCESSING APPARATUS AND SENSING METHOD

The contents of the following patent application(s) are incorporated herein by reference:

NO. 2023-092137 filed in JP on Jun. 5, 2023

BACKGROUND

1. Technical Field

The present invention relates to an information processing apparatus and a sensing method.

2. Related Art

Conventionally, an information processing apparatus for sensing an object by using a Doppler radar is known (for example, refer to Patent Document 1).

Patent Document 1: Japanese Patent No. 6029108

DESCRIPTION OF EXEMPLARY EMBODIMENTS

Hereinafter, the present invention will be described through embodiments of the invention, but the following embodiments do not limit the invention according to claims. In addition, not all of the combinations of features described in the embodiments are essential to the solution of the invention.

Figure 1A:
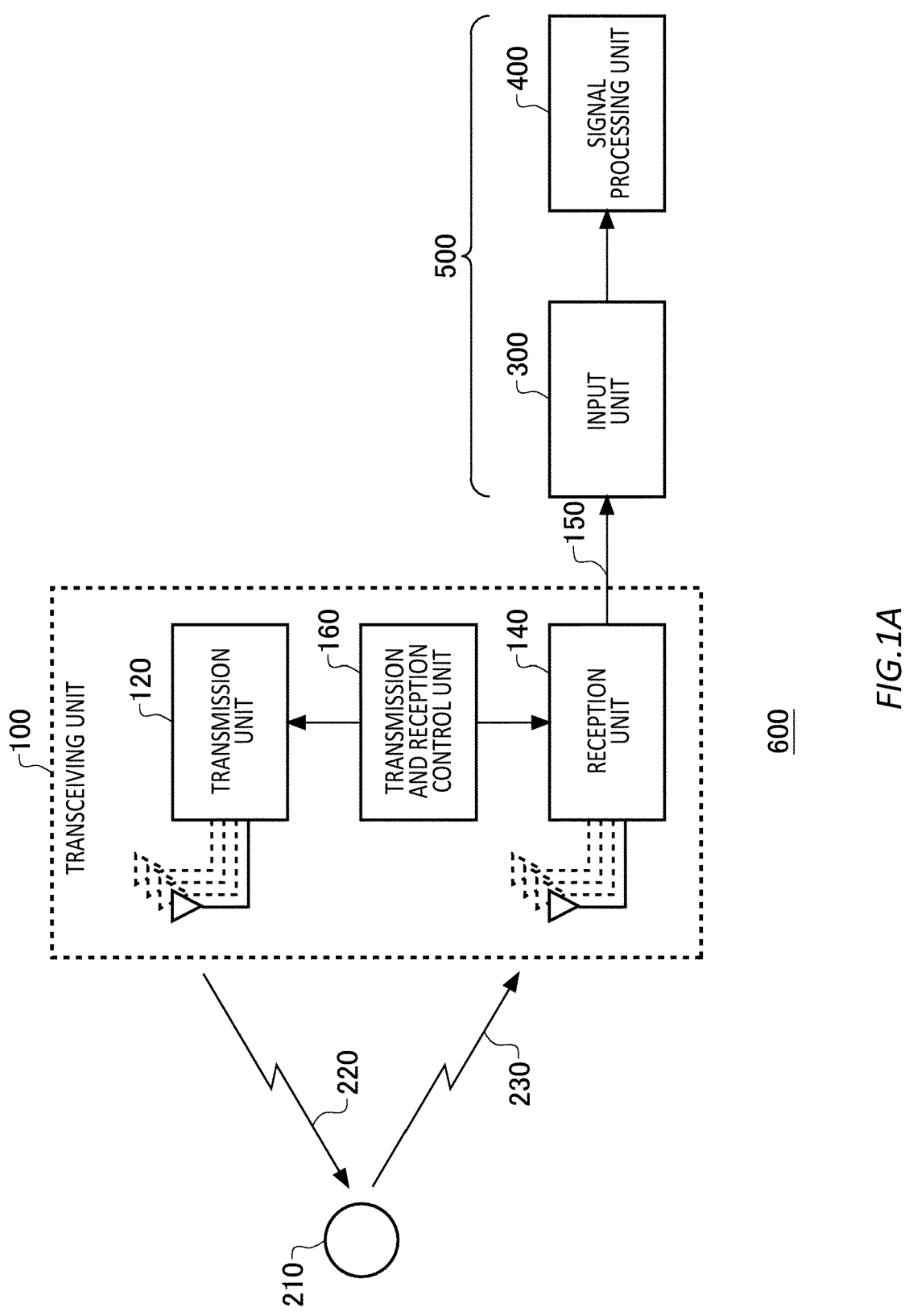
FIG. 1A illustrates an outline of a configuration of a system 600.

FIG. 1A illustrates an outline of a configuration of a system 600. The system 600 includes a transceiving unit 100 and an information processing apparatus 500. The transceiving unit 100 has a transmission unit 120 and a reception unit 140.

The transmission unit 120 transmits a Frequency Modulated Continuous Wave radar (FMCW radar) to the object 210 as a transmitted wave 220. The FMCW radar is a continuous wave radar with modulated frequency. For example, the FMCW radar has a burst wave including a plurality of chirps. In each chirp, the frequency is swept in time. The transmission unit 120 may have a plurality of transmission antennas.

The reception unit 140 receives a reflected wave of the FMCW radar that is reflected at the object 210. The reception unit 140 of the present example demodulates a received wave 230 to generate an analog beat signal 150. The reception unit 140 may have a plurality of reception antennas. By providing a plurality of reception antennas, information related to an angle θ of the object 210 that is seen from the transceiving unit 100 can be acquired.

The beat signal 150 is an example of an IF signal that is down-converted to IF (Intermediate Frequency) frequency proportional to a TOF (Time of Flight) of the reflected wave. The TOF is the time until the transmitted wave 220 is received as a reflected wave, and increases as the distance R between the transceiving unit 100 and the object 210 increases. The frequency of the beat signal 150 is proportional to the TOF, and therefore also changes proportional to the distance R.

A transmission and reception control unit 160 controls a transmission and reception of a signal by the transmission unit 120 and the reception unit 140. In an example the transmission and reception control unit 160 controls a modulation width and a period of the frequency of a chirp of the transmitted wave 220.

The information processing apparatus 500 calculates the distance R and the speed V of the object 210 by performing the AD conversion on the beat signal 150 and perform a signal processing. The information processing apparatus 500 of the present example can sense a minute vibration of units of several mm by calculating the distance R by a phase. The information processing apparatus 500 has an input unit 300 and a signal processing unit 400.

The input unit 300 converts an analog beat signal 150 that is input from the reception unit 140 into a digital received signal. The received signal may be a received signal of the plurality of antennas included in the reception unit 140. The input unit 300 may be an ADC that is configured by an integrated circuit such as RFIC.

The signal processing unit 400 is a digital signal processor (DSP) that performs a signal processing such as FFT or the like based on the digital received signal output by the input unit 300. The signal processing unit 400 senses the object 210 by processing the digital received signal. In the present specification, the sensing of the object 210 means acquiring the distance R, the speed V, the angle θ, or the like of the object 210 to detect the existence of the object 210. Note that the distance R, the speed V, and the angle θ of the object 210 are described below.

In addition, the signal processing unit 400 senses the object 210 based on micro-vibration data of the object 210. In the present specification, the sensing of the object 210 means acquiring a biosignal of the micro-vibration data or the like of the object 210. The biosignal exists when the object 210 is a living subject, and is generated by breathing, heartbeat or the like.

The micro-vibration data is data based on the heartbeat or the breathing of the object 210. In an example, the information processing apparatus 500 can obtain, as micro-vibration data, a resolution in which the wavelength of the FMCW radar is the maximum. For example, the information processing apparatus 500 can obtain a resolution that is 100 times to 1000 times that of one wavelength of the millimeter wave band (about 30 to 300 GHz frequency band) used for the FMCW radar.

The system 600 senses the object 210 by transmitting the FMCW radar to the object 210. The system 600 can sense the object 210 by appropriately performing a signal processing on the received signal derived from the modulated frequency of the FMCW radar, even if a relative speed between the system 600 and the object 210 is 0.

Figure 1B:
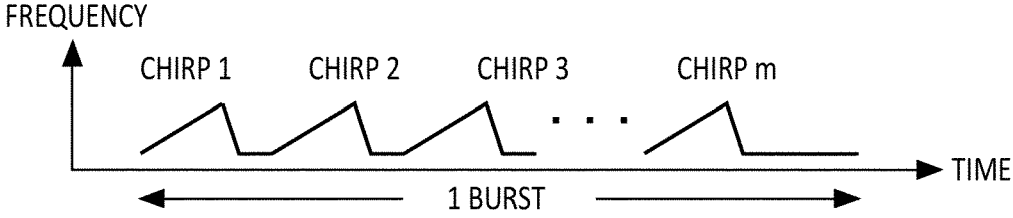
FIG. 1B illustrates an example of a transmitted wave 220 being transmitted by a transmission unit 120.

FIG. 1B illustrates an example of a transmitted wave 220 being transmitted by a transmission unit 120. The transmitted wave 220 includes m chirps in one burst. m is an integer of 2 or more. The transceiving unit 100 calculates the distance R, the speed V, and the angle θ of the object 210 by modulating the frequency of the chirp and analyzing a differential between the transmitted wave 220 and the received wave 230. The transceiving unit 100 may appropriately adjust a modulation width or a period of the frequency of the chirp in accordance with a position or the like of the object 210. The transmitted wave 220 of the present example includes a chirp of m same waveforms, but may include a chirp of a different waveform.

The FMCW radar is a radar which senses a distance to a target and a relative speed by utilizing a time difference of an echo being returned from the object 210. For example, the FMCW radar linearly raises or lowers the frequency at a cycle of about several microseconds to several hundred microseconds, and uses only one of up and down for sensing. However, in the FMCW manner, both the up and the down may be used for the sensing.

The FMCW radar can simultaneously sense angle information by positioning a plurality of channels. For example, the FMCW radar realizes a long-distance sensing in a 76G band (76 to 77 GHz) and realizes a medium-distance sensing or a short-distance sensing in a 79G band (77 to 81 GHz). Note that the FMCW radar may have a system in which the frequency is linearly raised or lowered in a cycle of about several milliseconds to several hundred milliseconds.

Figure 1C:
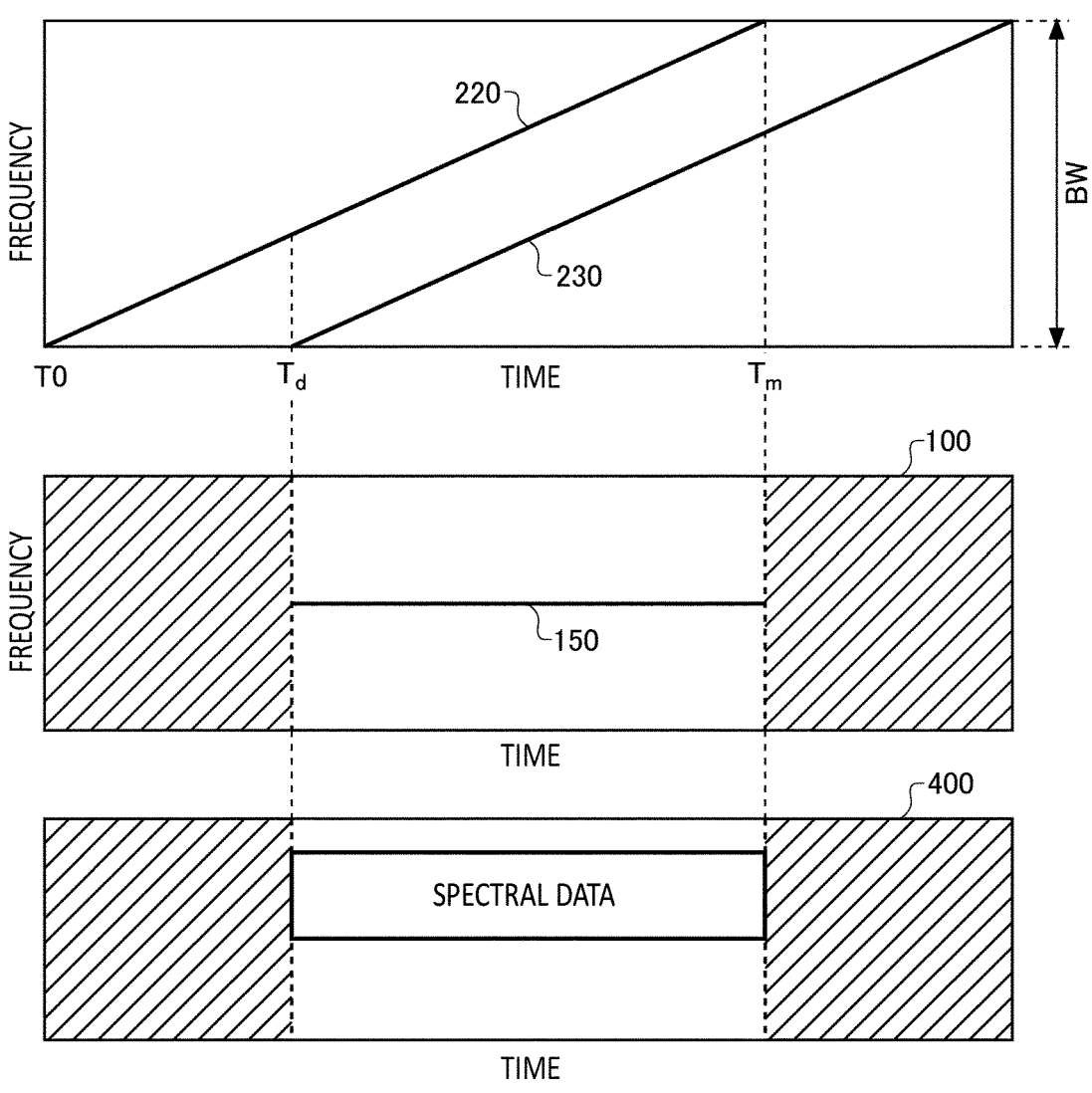
FIG. 1C is a diagram for describing an example of signal processing by an information processing apparatus 500.

FIG. 1C is a diagram for describing an example of signal processing by an information processing apparatus 500.

The frequency of the chirp of the transmitted wave 220 is linearly raised from a low frequency in a period from a clock time T0 to a clock time Tm. The received wave 230 is received after a delay time Td in accordance with the distance R to the object 210. The delay time Td changes in accordance with the distance R from the object 210.

The beat signal 150 is generated in the transceiving unit 100. The beat signal 150 is generated from a differential between the chirp of the transmitted wave 220 and the chirp of the received wave 230. The frequency of the beat signal 150 is proportional to the length of the delay time Td.

Spectral data is calculated, by the signal processing unit 400, by using a signal between the clock time Td and the clock time Tm, in which the frequency of the beat signal 150 is relatively stable. A specific calculating method of the spectral data is described below.

Figure 1D:
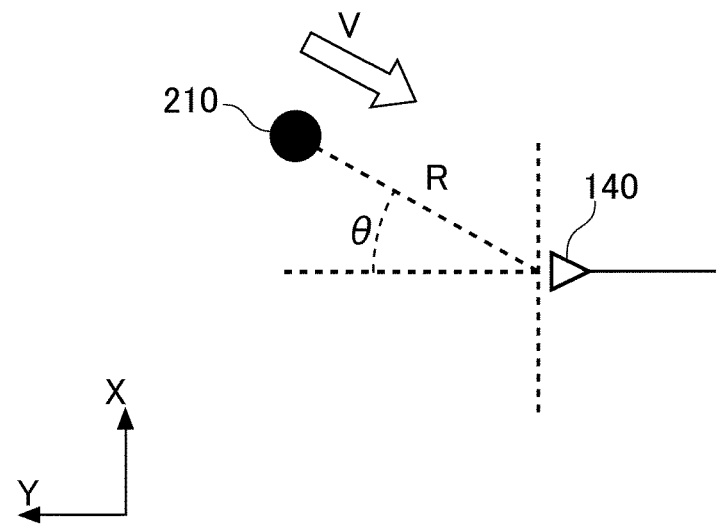
FIG. 1D is a diagram for describing a distance R, speed V, and an angle θ of an object 210.

FIG. 1D is a diagram for describing a distance R, speed V, and an angle θ of an object 210. In the present example, for simplicity, the transmission unit 120 and the reception unit 140 are considered to be the same position.

The object 210 varies with the speed V at a position which has the distance R from the transceiving unit 100. The speed V is a relative speed between the transceiving unit 100 and the object 210. The angle θ is an angle of the object 210 that is seen from the transceiving unit 100. Specifically, a direction in which the reception unit 140 is arranged is an X-axis direction, and when a direction in which the FMCW radar is emitted is a Y-axis, the angle θ is an angle in an XY plane that is formed by the Y-axis and the position of the object 210.

Figure 1E:
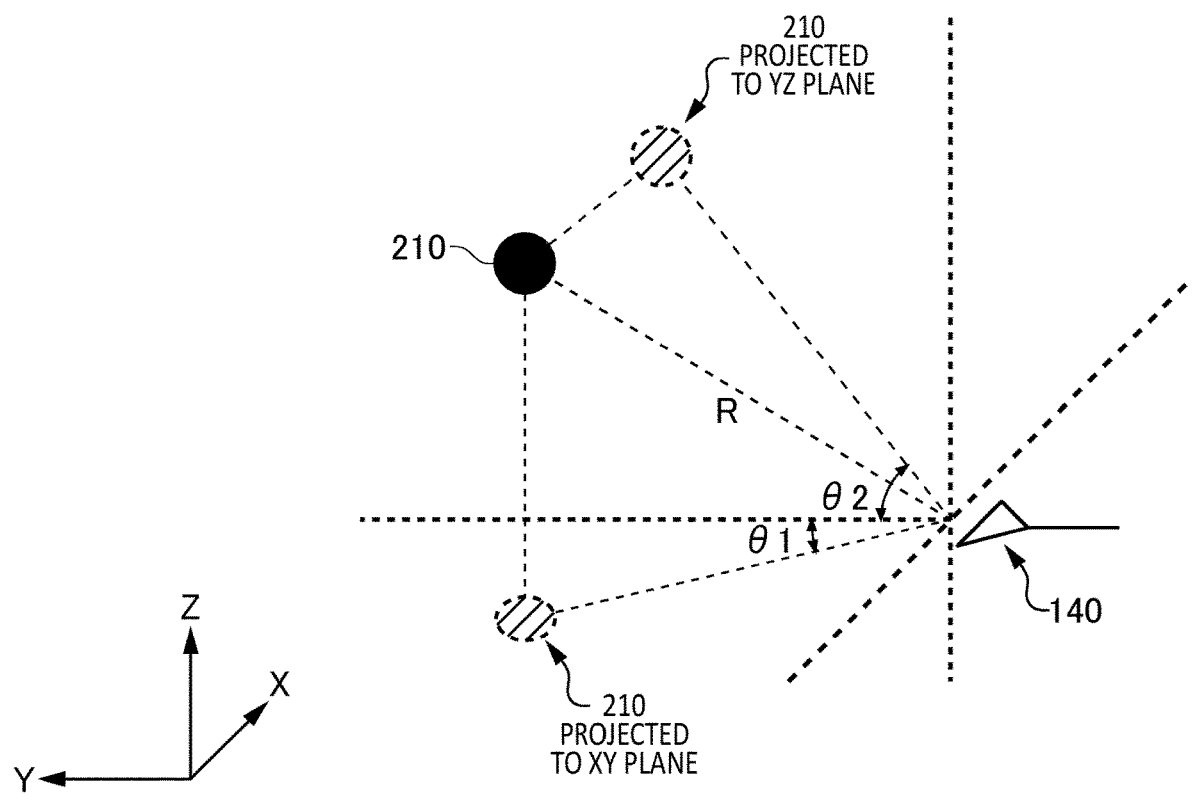
FIG. 1E is a diagram for describing a distance R, speed V, an angle θ1, and an angle θ2 of the object 210.

FIG. 1E is a diagram for describing a distance R, speed V, an angle θ1, and an angle θ2 of the object 210. The information processing apparatus 500 can also detect and sense the object 210, as a so-called 3D radar detecting a new axis (Z-axis) that is perpendicular to the XY plane, with a similar principle. In that case, the information processing apparatus 500 acquires three-dimensional information by using the angle θ2 formed by projecting the object 210 to the YZ plane, in addition to the angle θ1 formed by projecting the object 210 to the XY plane. Note that, in the case of simply referring to the angle θ in the present specification, it may be interpreted as including both the angle θ1 and the angle θ2.

Figure 2:
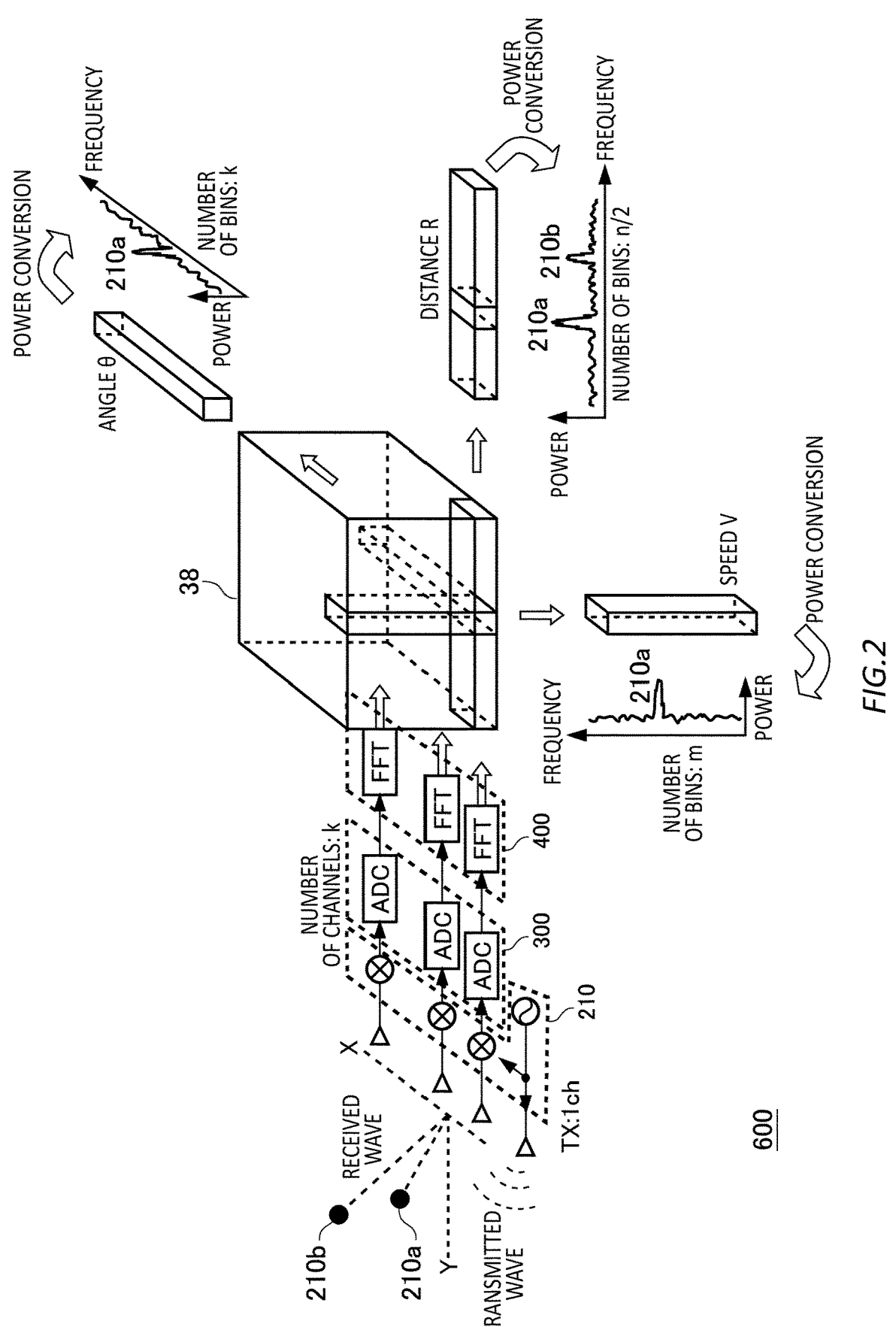
FIG. 2 is a diagram for describing an operating principle of a system 600.

FIG. 2 is a diagram for describing an operating principle of a system 600. The system 600 acquires pieces of information related to the distance R, the speed V, and the angle θ of the object 210 by using a data cube 38.

The transceiving unit 100 has a plurality of channels. In an example, the transceiving unit 100 has one transmission antenna and k reception antennas. k is an integer of 1 or more. The transceiving unit 100 can detect the angle θ by having the plurality of channels. Reflected signals from the object 210a and the object 210b are input to each of the k reception antennas.

The data cube 38 includes a data sequence related to each of the distance R, the speed V, and the angle θ. The data cube 38 includes each of a distance data sequence obtained by distance FFT, a speed data sequence obtained by speed FFT, and an angle data sequence obtained by angle FFT.

By performing a power conversion on the distance data sequence, a distance power spectrum having the number of bins of n/2 is obtained. The distance power spectrum includes two distance peak bins corresponding to the distance from the object 210a and the distance from the object 210*b*. The distance peak bin may be a bin having a peak corresponding to the distance from the object 210 in the distance power spectrum.

A speed power spectrum whose number of bins is m is obtained by performing speed FFT on a data sequence corresponding to a distance peak bin position of the distance power spectrum and performing a power conversion on a newly obtained speed data sequence. The speed power spectrum includes a speed peak bin corresponding to the speed of the object 210*a* or the object 210*b*. The speed peak bin may be a bin having a peak corresponding to the speed of the object 210 in the speed power spectrum. Whether the speed peak bin and the peak correspond to the speed of the object 210*a* or the object 210*b* depends on the distance peak bin position of the selected distance power spectrum.

An angle power spectrum whose number of bins is k is obtained by performing angle FFT on a data sequence corresponding to a distance peak bin position of the distance power spectrum and performing a power conversion on a newly obtained angle data sequence. The angle power spectrum includes an angle peak bin corresponding to the angle of the object 210*a* or the object 210*b*. The angle peak bin may be a bin having a peak corresponding to the angle of the object 210 in the angle power spectrum. Whether the angle peak bin and the peak correspond to the angle of the object 210*a* or the object 210*b* depends on the distance peak bin position of the selected distance power spectrum.

The information processing apparatus 500 calculates, in a time series manner, phase information obtained by performing a phase conversion on an angle data sequence of the object 210 obtained by the angle FFT, and acquires biosignal data of the object 210. Note that a bin position of the phase information used as biosignal information corresponds to an angle peak bin position of the angle power spectrum. The biosignal data is an example of an output signal of the information processing apparatus 500.

Figure 3A:
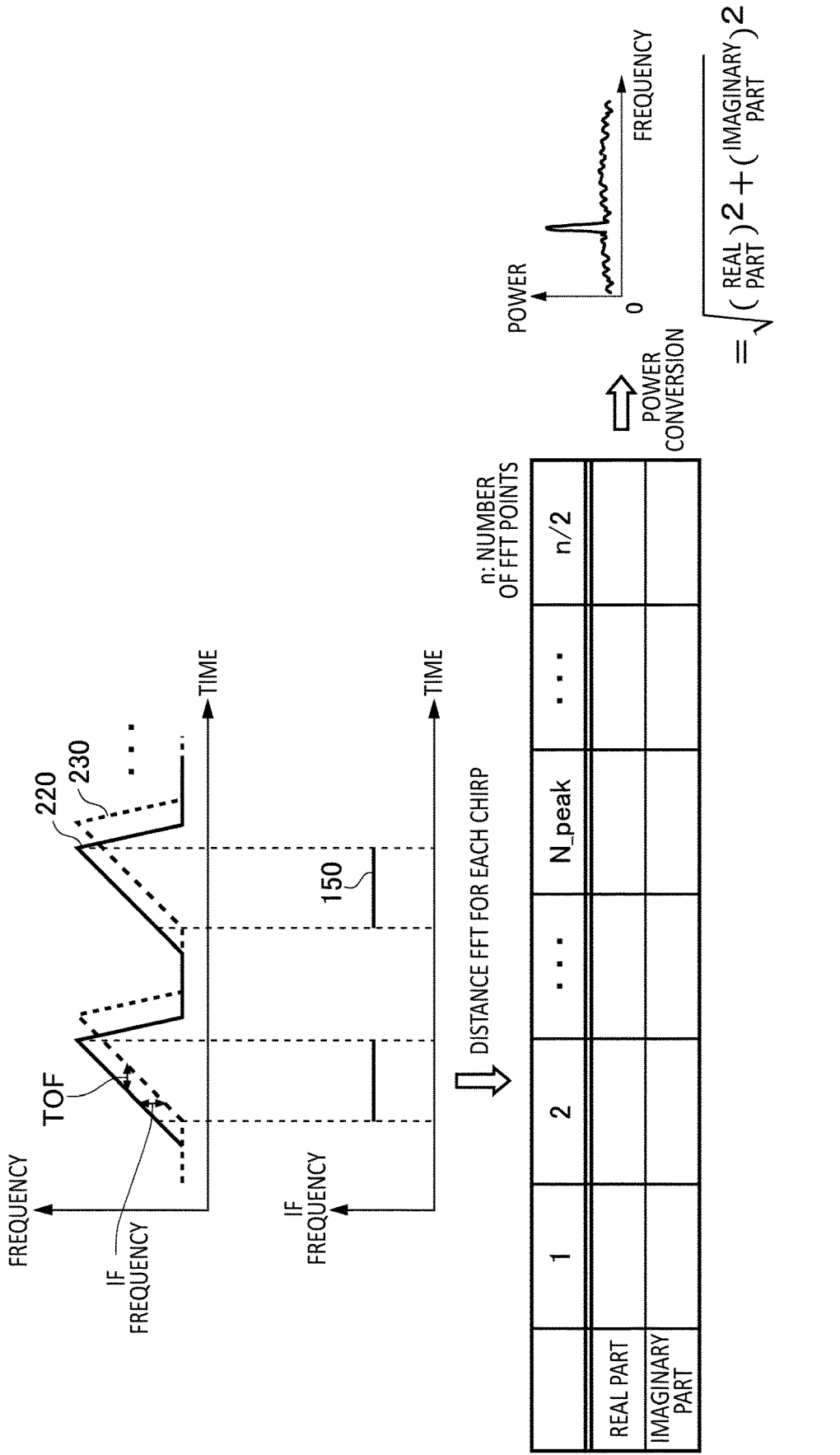
FIG. 3A is a diagram for describing a principle of sensing the distance R to the object 210.

FIG. 3A is a diagram for describing a principle of sensing the distance R to the object 210. The distance R to the object 210 is calculated by performing distance FFT of at least one chirp. The solid line in the graph illustrates the transmitted wave 220 and the dashed line illustrates the received wave 230. A vertical axis represents a frequency and a horizontal axis represents a time.

An IF frequency is a frequency of the beat signal 150 obtained by mixing the transmitted wave 220 and the received wave 230 of the FMCW radar. The IF frequency becomes higher as the distance R between the information processing apparatus 500 and the object 210 becomes larger. The information processing apparatus 500 can obtain, for a specific period, the IF frequency that is proportional to the distance R to the object 210. That is, the information processing apparatus 500 can acquire the distance R to the object 210 by analyzing the IF frequency.

The information processing apparatus 500 performs distance FFT processing for each chirp. For example, when the number of FFT points is n points, data sequences of both a real part and an imaginary part are obtained by n/2 points, and the number of bins is n/2. The information processing apparatus 500 calculates the distance peak bin by performing a power conversion based on the result of the distance FFT. The information processing apparatus 500 can calculate the distance R to the object 210 based on the frequency in which a peak appears.

Figure 3B:
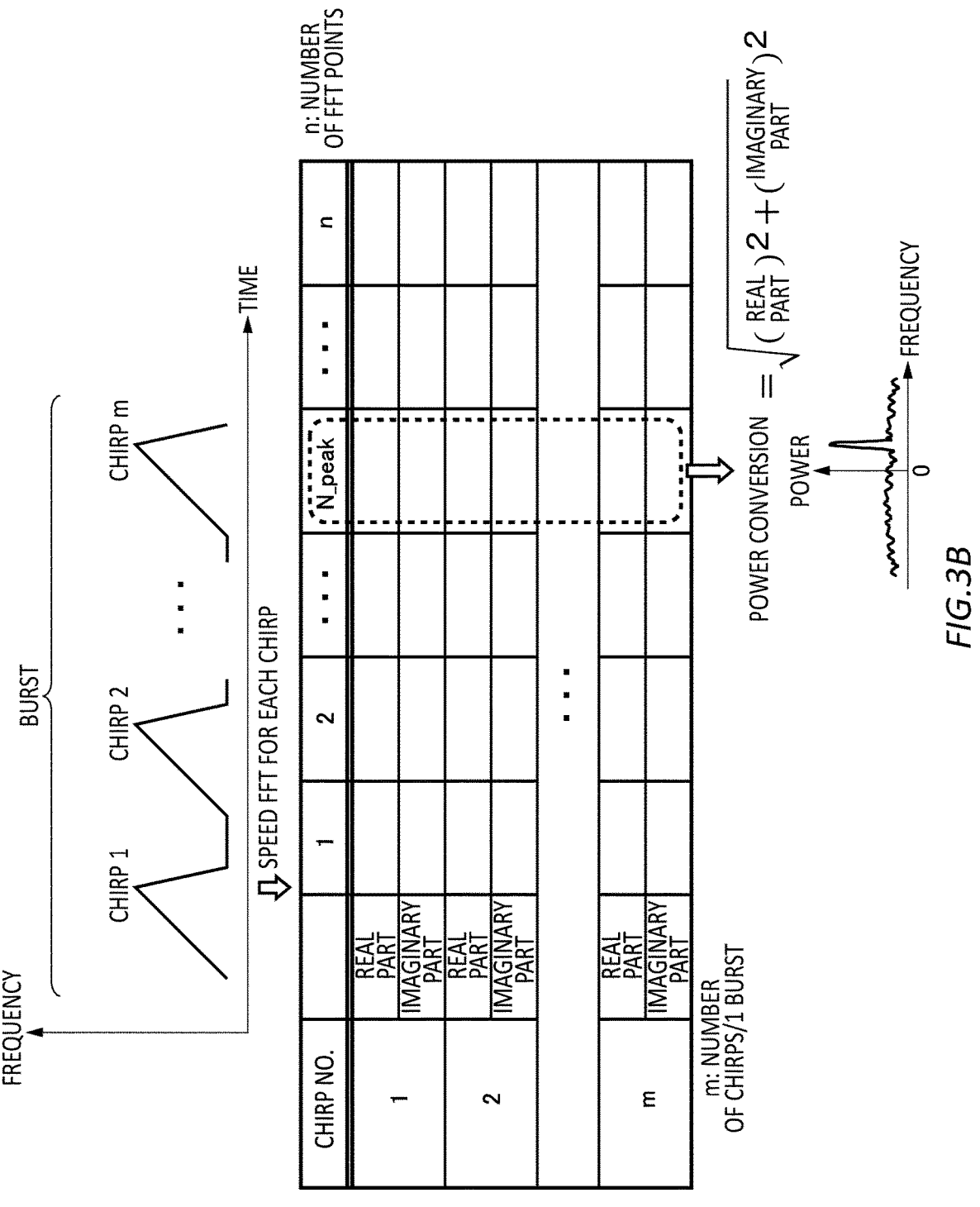
FIG. 3B is a diagram for describing a principle of sensing the speed V of the object 210.

FIG. 3B is a diagram for describing a principle of sensing the speed V of the object 210. For each table sequence obtained by the distance FFT that is performed on multiple times of chirps in the burst, speed FFT is performed on a new data sequence corresponding to the distance peak bin position of the distance power spectrum. M times of chirps are included in one burst. The speed V of the object 210 is calculated by performing a power conversion based on the result of the speed FFT.

The information processing apparatus 500 performs speed FFT processing for one burst. For example, when the number of chirps in one burst is m, data sequences of both the real part and the imaginary part are obtained by m points, and the number of bins is m. The information processing apparatus 500 calculates the speed peak bin position by performing a power conversion based on the result of the speed FFT. The information processing apparatus 500 can calculate the speed V from the frequency of the speed peak bin in the speed FFT.

Figure 3C:
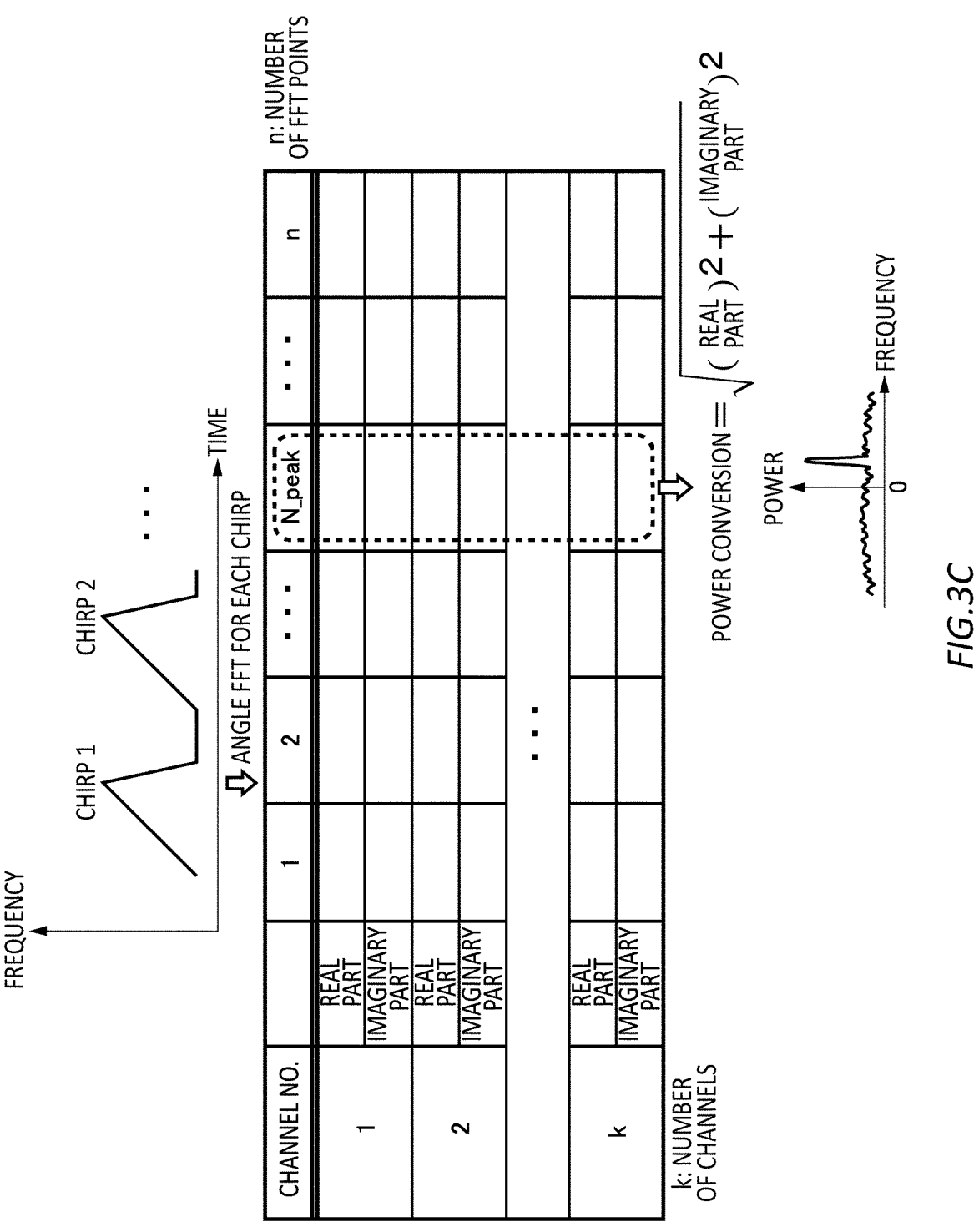
FIG. 3C is a diagram for describing a principle of sensing the angle θ of the object 210.

FIG. 3C is a diagram for describing a principle of sensing the angle θ of the object 210. The angle θ is obtained by performing, for each table sequence obtained by the distance FFT that is performed on the chirp of each channel, angle FFT on a new data sequence corresponding to the distance peak bin position of the distance power spectrum. By one chirp, k chirps corresponding to k channels may be included or one chirp may be included as a whole. As an example, when MIMO (Multi-Input and Multi-Output) technology is used, k chirps corresponding to k channels are included.

The information processing apparatus 500 performs angle FFT processing for k channels. For example, for k channels, data sequences of both the real part and the imaginary part are obtained by k points, and the number of bins is k. The information processing apparatus 500 receives the received wave 230 at the reception unit 140 of the k channels arranged in the X-axis direction. Since a phase difference between the received waves occurs on the received waves 230 received by each reception unit 140 corresponding to the angle θ of the object 210, the information processing apparatus 500 can calculate the angle θ of the object 210 by analyzing the received signal of the k channels.

Figure 4A:
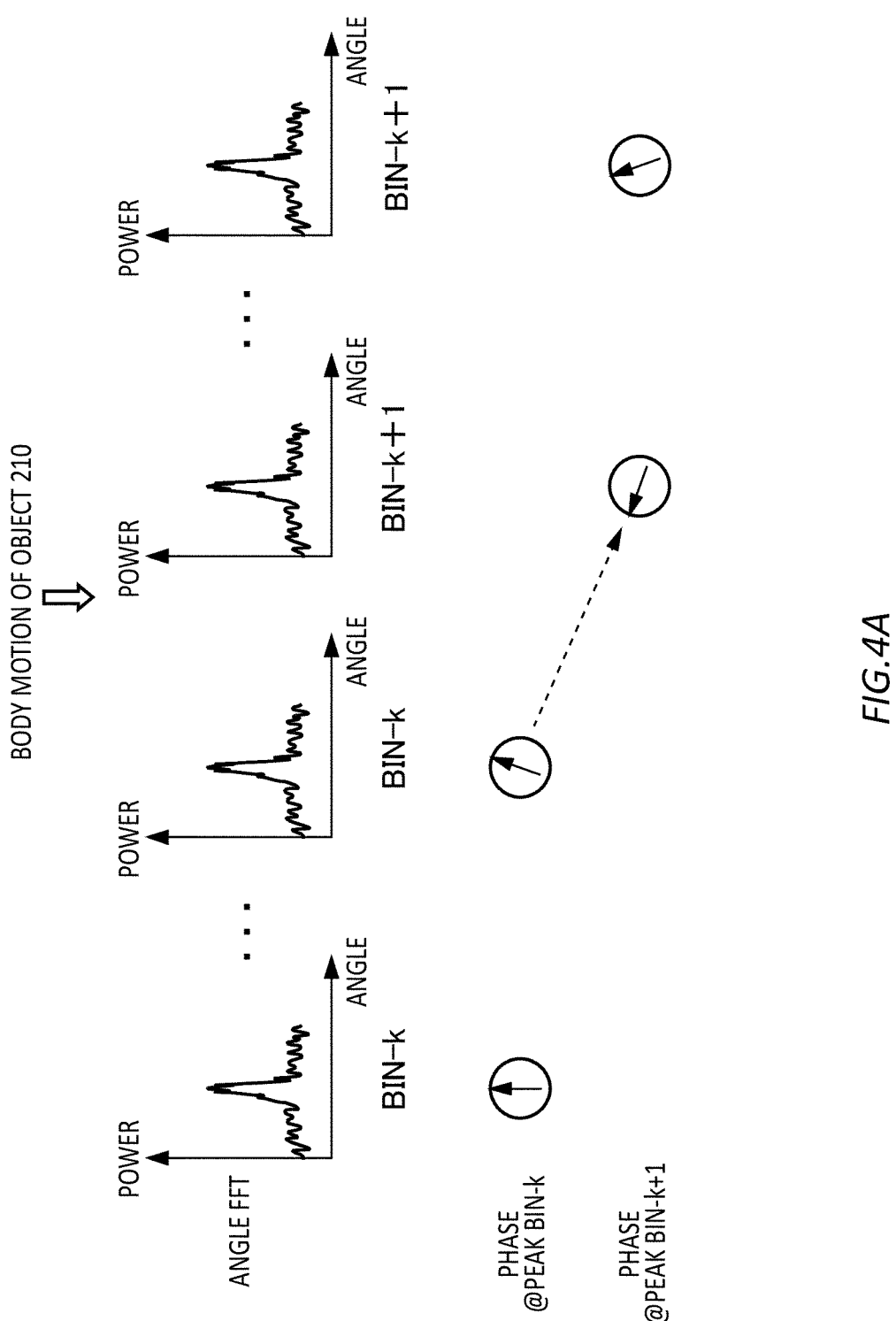
FIG. 4A is a diagram for describing a method of sensing an object 210 with a body motion.

FIG. 4A is a diagram for describing a method of sensing an object 210 with a body motion. A body motion of the object 210 is a large movement compared to a biosignal such as a heartbeat. If there is a body motion of the object 210, the position of the angle peak bin of the angle power spectrum may be moved. If the object 210 does not exist in a single bin and the bin is changed, a phase discontinuity (That is, a phase shift) may occur.

The information processing apparatus 500 can obtain exact angle information of the object 210 provided that the object 210 tracks the angle peak bin in the angle FFT based on a basic principle of living subject sensing by the FMCW radar. On the other hand, even when the angle peak bin is changed, if only the single bin is tracked, a phase information accuracy obtained may be deteriorated compared to a case in which the angle peak bin is tracked. With the information processing apparatus 500 in the present example, such deterioration of the phase information accuracy can be prevented by compensating for the phase shift.

Figure 4B:
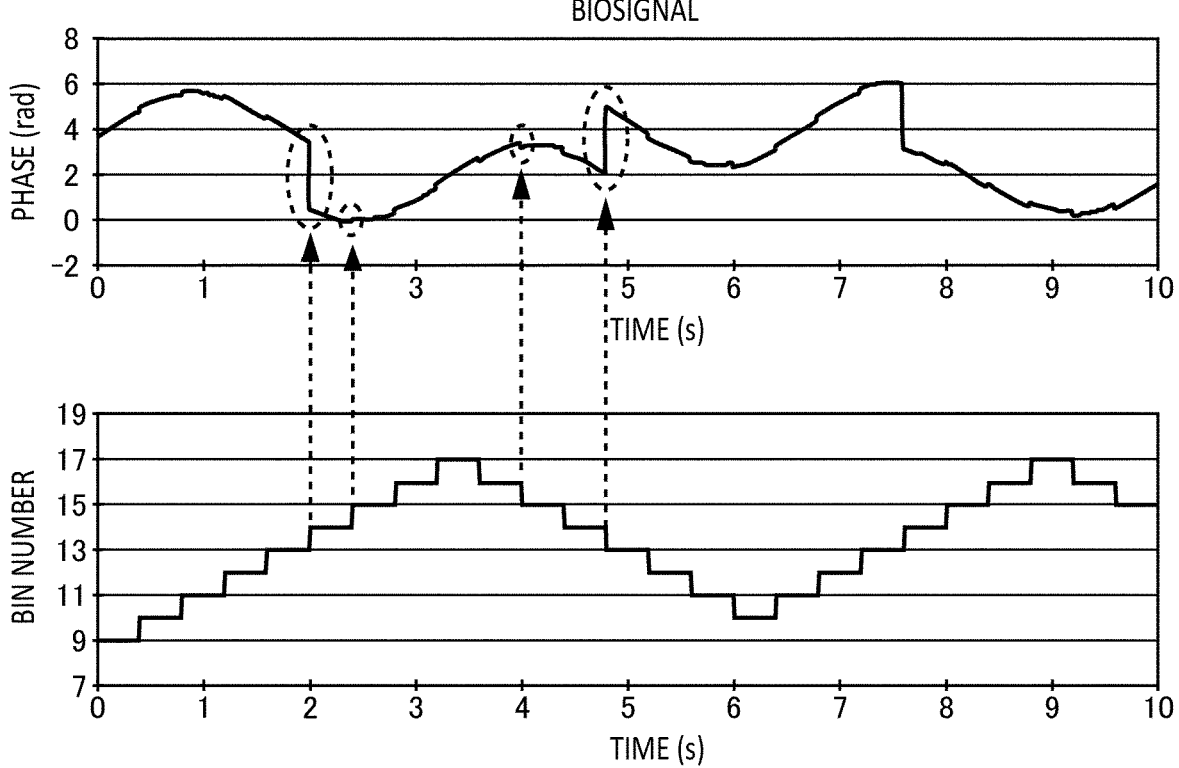
FIG. 4B illustrates an example of an effect of the body motion of the object 210.

FIG. 4B illustrates an example of an effect of the body motion of the object 210. To extract such body motion, the phases are acquired at many points of the chirp. However, if the angle peak bin from which the phase value is acquired is changed, the phase signal may be discontinuous, causing a phase shift of approximately π[rad] or less than π[rad] to occur. The value of the phase shift depends on the number of bins to be transited. In the present example, in a period from 0 seconds to 10 seconds, if the angle peak bin changes in a range from the bin number 9 to 17, several phase shifts occur.

Figure 5A:
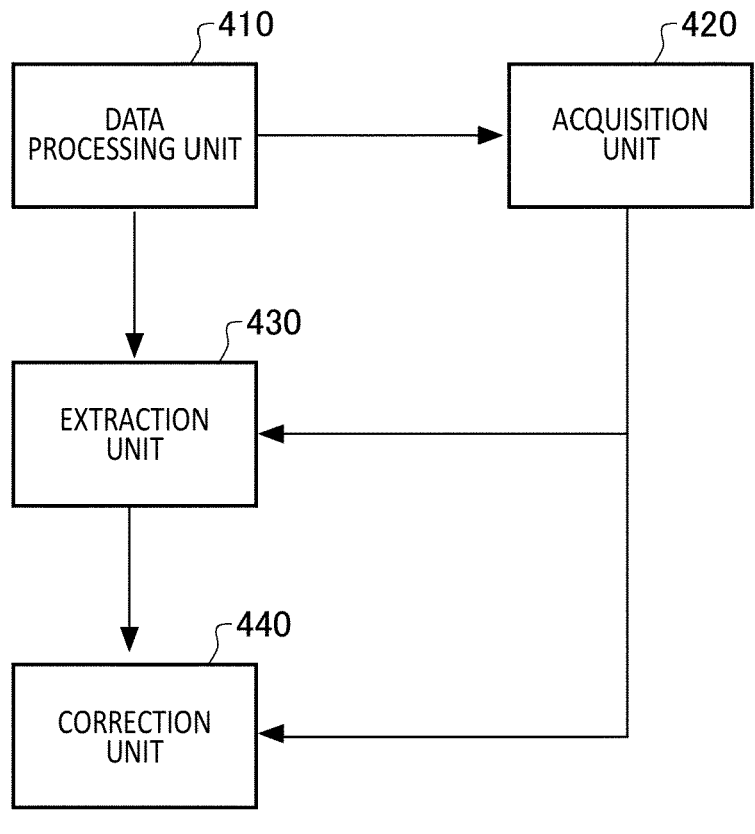
FIG. 5A illustrates an example of a configuration of a signal processing unit 400.

FIG. 5A illustrates an example of a configuration of a signal processing unit 400. The signal processing unit 400 includes a data processing unit 410, an acquisition unit 420, an extraction unit 430, and a correction unit 440.

The data processing unit 410 processes a received signal of a plurality of antennas derived from a received wave 230 for generating a power spectrum signal with a predetermined number of bins. The data processing unit 410 of the present example performs at least one of distance FFT, speed FFT, or angle FFT to generate the power spectrum signal. As an example, the data processing unit 410 acquires an angle power spectrum related to an angle with the object 210 by performing the angle FFT on the received signal. As another example, the data processing unit 410 may acquire a distance power spectrum related to a distance from the object 210 by performing the distance FFT on the received signal, or may acquire speed power spectrum related to speed of the object 210 by performing the speed FFT on the received signal. Note that the data processing unit 410 may process the received signal by using a CAPON method or another algorithm such as compressed sensing.

The acquisition unit 420 acquires a peak bin corresponding to the object 210 based on the power spectrum signal output by the data processing unit 410. When the bin number of the peak bin to which the object 210 belongs changes, the acquisition unit 420 may change the peak bin to be acquired. As an example, the acquisition unit 420 acquires an angle peak bin indicating the angle with the object 210 based on the angle power spectrum. As another example, the acquisition unit 420 may acquire a distance peak bin indicating the distance from the object 210 based on the distance power spectrum, or may acquire a speed peak bin indicating the speed of the object 210 based on the speed power spectrum.

The extraction unit 430 extracts a predetermined output signal from the power spectrum signal. The extraction unit 430 of the present example extracts IQ data including an in-phase component and a quadrature component that is orthogonal to the in-phase component, based on the peak bin acquired by the acquisition unit 420. As an example, the extraction unit 430 may extract the output signal corresponding to the angle power spectrum. As another example, the extraction unit 430 may extract the output signal corresponding to the distance power spectrum, or may extract the output signal corresponding to the speed power spectrum.

The correction unit 440 performs a phase correction algorithm based on the IQ data extracted by the extraction unit 430 and the detection result of the acquisition unit 420. The correction unit 440 corrects a phase of the output signal in accordance with the bin number of the plurality of peak bins. In this manner, the correction unit 440 can reduce the effect of the phase shift that occurs when a bin number that belongs to the object 210 changes over time. A specific operation of the correction unit 440 is described below.

Figure 5B:
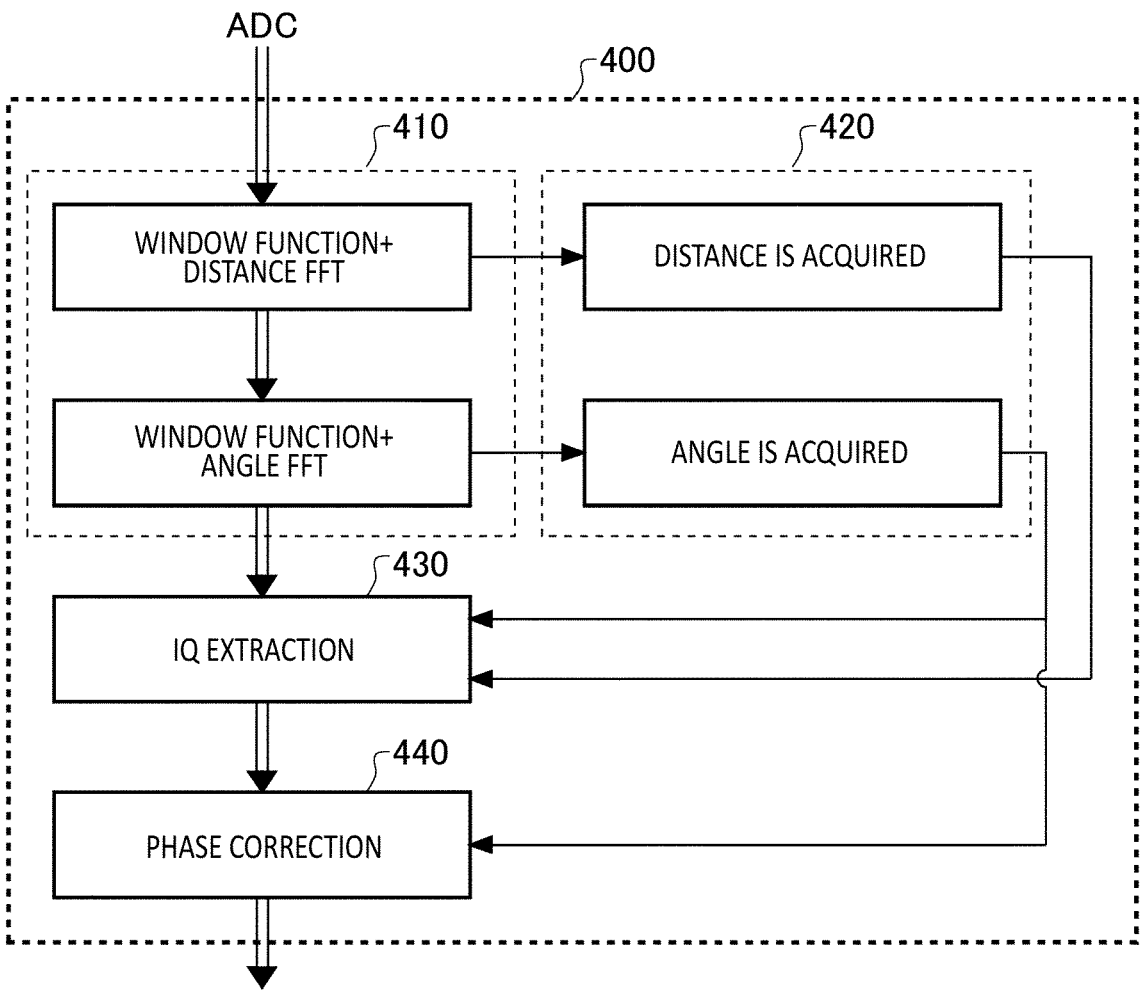
FIG. 5B illustrates an example of the operation of the signal processing unit 400.

FIG. 5B illustrates an example of the operation of the signal processing unit 400. The signal processing unit 400 receives a digital signal that is AD-converted at the input unit 300.

The data processing unit 410 performs distance FFT processing. The data processing unit 410 acquires a distance power spectrum by performing a window function processing and distance FFT on the received signal. In addition, the data processing unit 410 performs angle FFT. The data processing unit 410 acquires an angle power spectrum by performing the window function processing and the angle FFT on the received signal. The data processing unit 410 outputs, to the acquisition unit 420, the distance power spectrum and the angle power spectrum which are generated.

The acquisition unit 420 acquires a distance peak bin indicating the distance R from the object 210 based on the distance power spectrum. The acquisition unit 420 may acquire a peak position by a simple peak detection algorithm or may acquire the peak position by using another algorithm such as a CFAR algorithm. The acquisition unit 420 outputs, to the extraction unit 430, information related to the acquired distance R, the distance R being a distance from the object 210. The acquisition unit 420 may output, to the correction unit 440, information related to the acquired distance R, the distance R being a distance from the object 210.

The acquisition unit 420 acquires an angle peak bin indicating the angle $\theta$ with the object 210 based on the angle power spectrum. The acquisition unit 420 of the present example acquires the angle peak bin in the angle FFT based on a data sequence corresponding to a distance peak bin position identified by the distance FFT. In this manner, an angle $\theta$ of any object 210 that is selected in accordance with the distance R can be acquired.

The extraction unit 430 acquires IQ data corresponding to the peak bin acquired by the acquisition unit 420 from the result of the distance FFT and the angle FFT performed by the data processing unit 410. The extraction unit 430 may directly extract the IQ data from the power spectrum signal, or may use another algorithm such as compressed sensing. The extraction unit 430 outputs the extraction result of the IQ data to the correction unit 440.

The correction unit 440 corrects a phase of the output signal of the data processing unit 410. The correction unit 440 of the present example corrects the phase of the output signal based on the angle acquisition result obtained after the angle FFT. For example, the correction unit 440 corrects a phase of the angle peak bin of the angle power spectrum in accordance with a bin number of the angle peak bin acquired by the angle FFT.

Figure 5C:
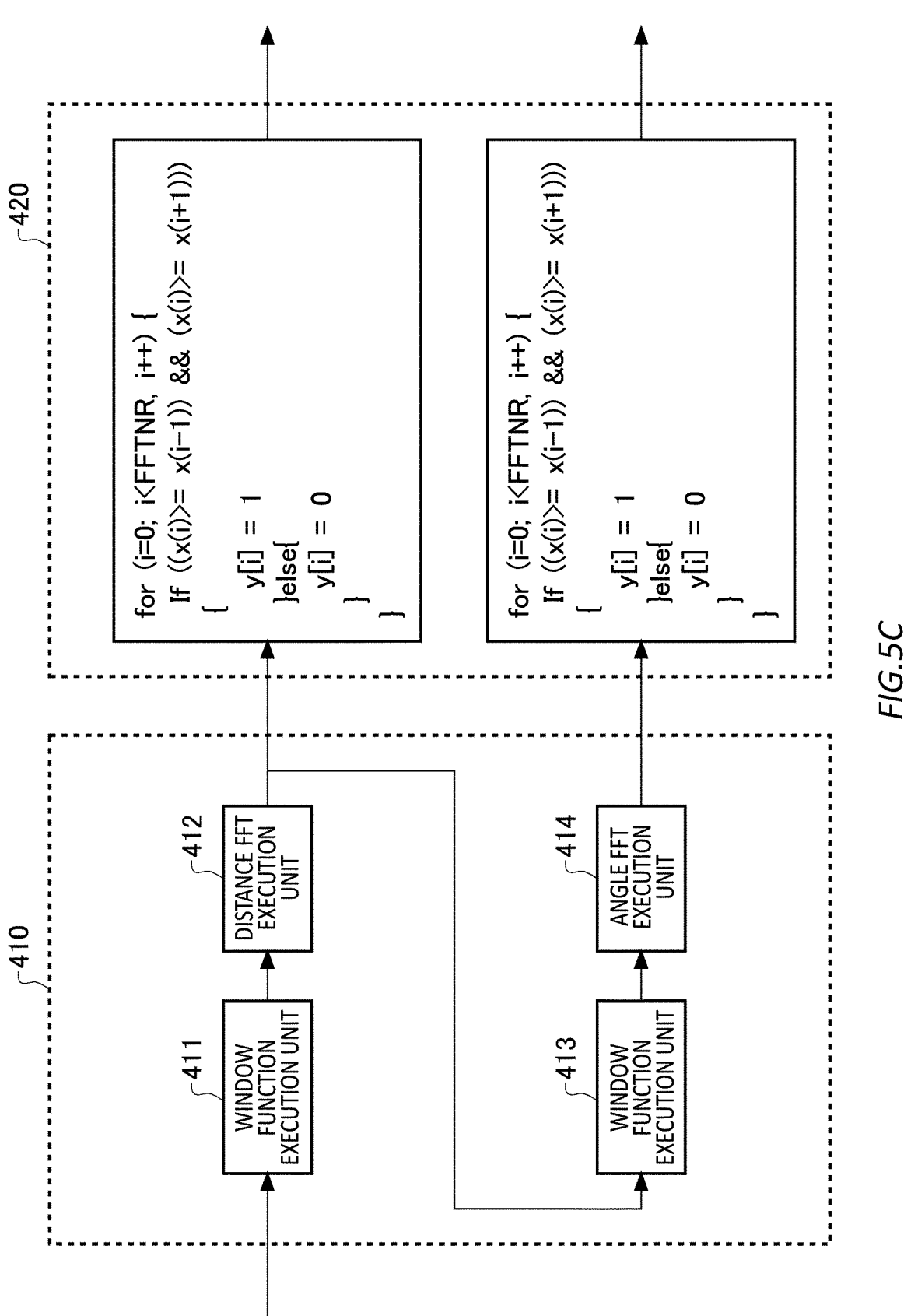
FIG. 5C is a drawing for describing a more detailed configuration of a data processing unit 410 and an acquisition unit 420.

FIG. 5C is a drawing for describing a more detailed configuration of the data processing unit 410 and the acquisition unit 420. The data processing unit 410 has a window function execution unit 411, a distance FFT execution unit 412, a window function execution unit 413, and an angle FFT execution unit 414.

The window function execution unit 411 performs a predetermined window function on the digital received signal. The window function execution unit 411 may use any window function such as a rectangular window, a Hann window, a Hamming window, or a Blackman window. The window function execution unit 411 may cut out the received signal by using a window function higher in order than that of the rectangular window. Each of the Hann window, the Hamming window, and the Blackman window is an example of the window function higher in order than that of the rectangular window.

In the present example, after the window function execution unit 411 cuts out the digital received signal, the distance FFT execution unit 412 performs the distance FFT to convert the signal that is cut out into a distance power spectrum in a frequency domain. However, the order of the FFT processing and the window function processing is not limited thereto. After the distance FFT execution unit 412 performed the distance FFT to convert the signal that is cut out into the distance power spectrum in the frequency domain, the window function execution unit 411 may cut out the signal. That is, the data processing unit 410 may apply a window function higher in order than that of the rectangular window when performing the distance FFT on the received signal, and the order of the FFT processing and the window function processing is freely chosen. A CAPON method or another algorithm such as compressed sensing may be used for the spectrum conversion. The data processing unit 410 may apply a window function higher in order than that of the rectangular window when performing the CAPON method or the algorithm of compressed sensing on the received signal.

The window function execution unit 413 causes a predetermined window function to act on the digital received signal. The window function execution unit 413 may use any window function such as a rectangular window, a Hann window, a Hamming window, or a Blackman window. The window function execution unit 413 may cut out the received signal by using a window function higher in order than that of the rectangular window. Each of the Hann window, the Hamming window, and the Blackman window is an example of the window function higher in order than that of the rectangular window.

In the present example, after the window function execution unit 413 cuts out the digital received signal, the angle FFT execution unit 414 performs the angle FFT to convert the signal that is cut out into an angle power spectrum in a frequency domain. However, the order of the FFT processing and the window function processing is not limited thereto. After the angle FFT execution unit 414 performed the angle FFT to convert the signal that is cut out into the angle power spectrum in the frequency domain, the window function execution unit 413 may cut out the signal. That is, the data processing unit 410 may apply a window function higher in order than that of the rectangular window when performing the angle FFT on the received signal, and the order of the FFT processing and the window function processing is freely chosen. A CAPON method or another algorithm such as compressed sensing may be used for the spectrum conversion. The data processing unit 410 may apply a window function higher in order than that of the rectangular window when performing the CAPON method or the algorithm of compressed sensing on the received signal.

The window function execution unit 411 and the window function execution unit 413 may use window functions of orders different from each other. That is, the data processing unit 410 may acquire the distance power spectrum by performing the distance FFT on the received signal to which a first window function is applied, and may acquire the angle power spectrum by performing the angle FFT on the received signal to which a second window function that is different from the first window function is applied. In this case, the second window function may be a window function higher in order than that of the first window function. Note that the orders of the first window function and the second window function may be the same, or the second window function may be a window function lower in order than that of the first window function.

If the order of the window function applied to the received signal on which the distance FFT is performed becomes high, there is a risk that phase signals of different objects 210 at the same distances are modulated with each other. On the other hand, if the order of the window function applied to the received signal on which the angle FFT is performed becomes high, the number of a phase shift π described below can be reduced, and a phase error of the output signal can be reduced. Accordingly, by setting the second window function as a window function higher in order than that of the first window function, the phase error of the output signal can be reduced while preventing the modulation of the phase signals of the different objects 210 at the same distances.

The acquisition unit 420 detects a peak position indicating a distance R or an angle θ of the object 210, by using a predetermined detection algorithm, from the power spectrum signal of the frequency domain that is output by the distance FFT execution unit 412 or the angle FFT execution unit 414. The acquisition unit 420 may acquire a peak position by a simple peak detection algorithm or may acquire the peak position by using another algorithm such as a CFAR algorithm. The acquisition unit 420 outputs, to the extraction unit 430 and the correction unit 440, a peak bin corresponding to the distance R and/or the angle θ of the object 210 that is acquired. The acquisition unit 420 of the present example outputs the distance peak bin and the angle peak bin to the extraction unit 430 and outputs the angle peak bin to the correction unit 440.

Figure 5D:
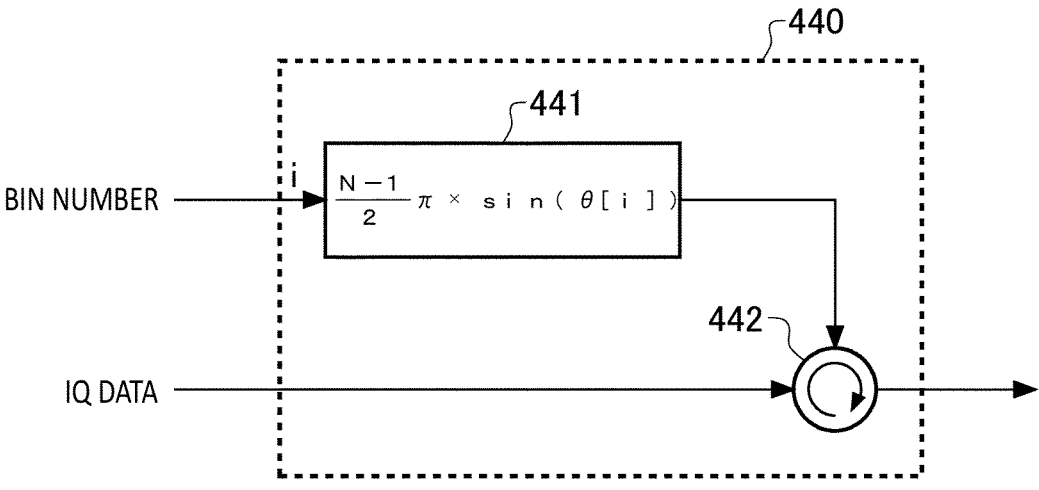
FIG. 5D is an example of a phase correction algorithm of a correction unit 440.

FIG. 5D is an example of a phase correction algorithm of a correction unit 440. The correction unit 440 has a phase selection unit 441 and a rotation unit 442.

The phase selection unit 441 selects a phase with a size corresponding to $(N-1)/2 \times \pi \times \sin(\theta(i))$ [rad] based on the bin number of the angle peak bin of the angle power spectrum. N is the number of a plurality of antennas, i is the bin number of the angle peak bin, and $\theta(i)$ [rad] is an angle corresponding to the bin number i of the angle peak bin.

The rotation unit 442 rotates a phase of the IQ data with a phase selected by the phase selection unit 441. In this manner, the correction unit 440 can correct the phase of the angle peak bin in accordance with the change of the bin number of the angle peak bin.

Figure 5E:
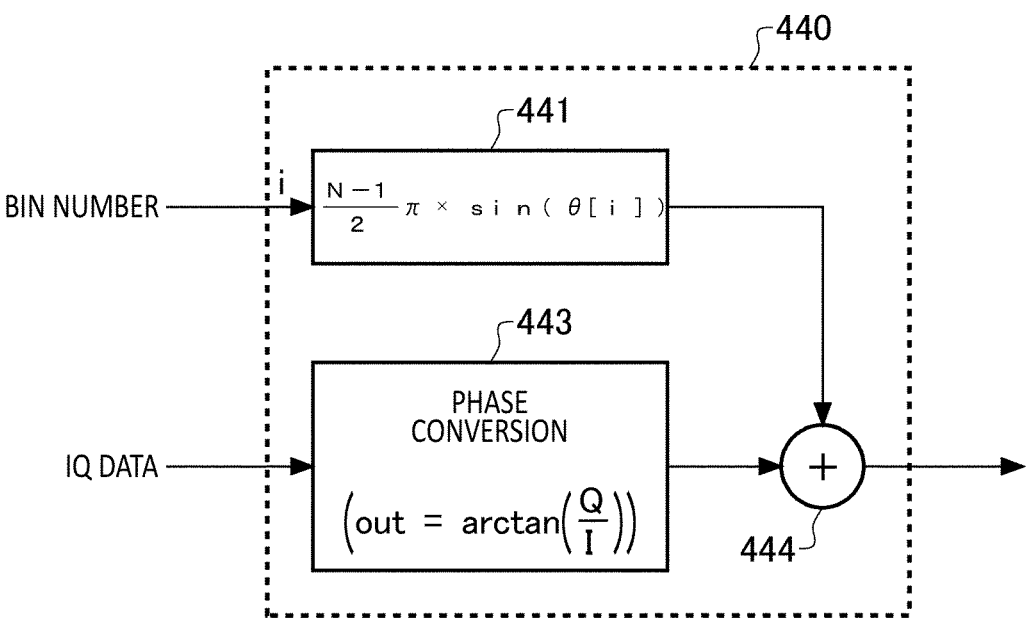
FIG. 5E is a variation of the phase correction algorithm of the correction unit 440.

FIG. 5E is a variation of the phase correction algorithm of the correction unit 440. The correction unit 440 has a phase selection unit 441, a phase conversion unit 443, and an addition/subtraction unit 444. The correction unit 440 of the present example corrects the phase of the angle peak bin so that a phase difference to be added or subtracted is $(N-1)/2 \times \pi \times \sin(\theta(i))$ [rad] in accordance with the bin number of the angle peak bin. N is the number of a plurality of antennas, i is a bin number of the angle peak bin, and $\theta(i)$ [rad] is an angle corresponding to the bin number i of the angle peak bin.

The phase conversion unit 443 converts the IQ data into phase data. The phase conversion unit 443 of the present example converts the IQ data into the phase data by calculating $\tan^{-1}(Q/I)$ from the IQ data.

The addition/subtraction unit 444 adds or subtracts the phase corresponding to $(N-1)/2 \times \pi \times \sin(\theta(i))$ [rad] to or from the phase data that is converted by the phase conversion unit 443 based on the bin number acquired by the acquisition unit 420.

Note that the data processing unit 410 may apply a window function higher in order than that of the rectangular window to the received signal to remove the phase shift of approximately π. The relationship between the high-order window function and the removal of the phase shift of approximately π is described below.

As described above, the information processing apparatus 500 of the present example corrects the phase of the output signal in accordance with the bin number of the angle peak bin. The number of data used for the angle FFT depends on the number of the plurality of antennas, and therefore may be less than the number of data used for the distance FFT. For this reason, to correct the phase of the output signal, zero-padding FFT or another complicated conversion algorithm may be needed. The information processing apparatus 500 of the present example can correct the phase of the output signal in accordance with the bin number of the angle peak bin so that the phase of the output signal is corrected without using the complicated algorithm.

Figure 6A:
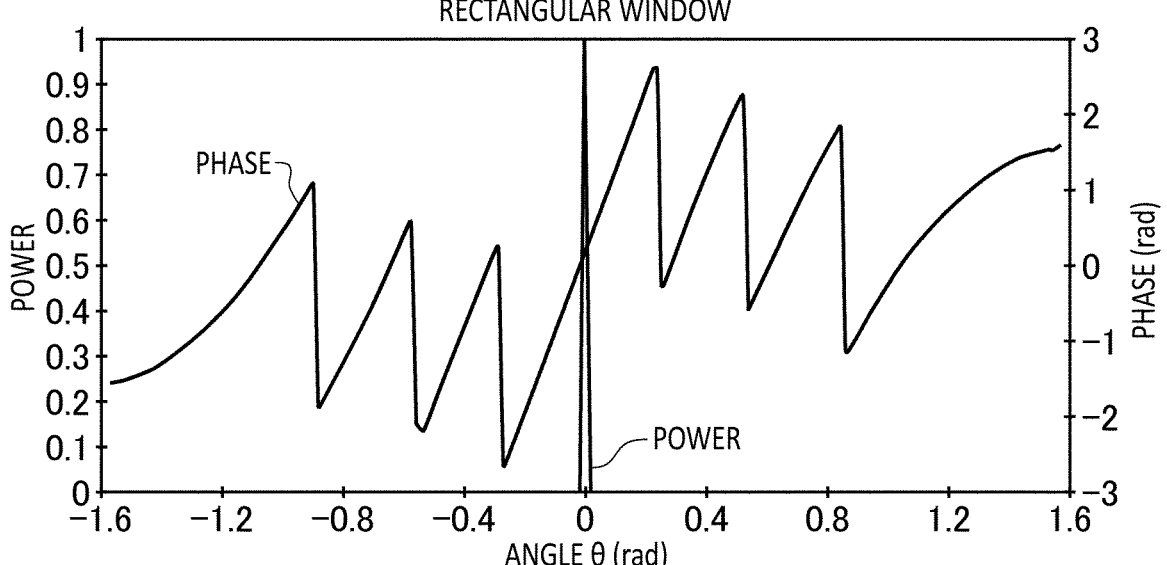
FIG. 6A illustrates an example of a relationship between signal power and a phase with respect to a bin number.

FIG. 6A illustrates an example of a relationship between signal power and a phase with respect to a bin number. The data processing unit 410 of the present example uses the rectangular window as the window function. The phase error of the output signal is subject to a sinusoidal function corresponding to the angle θ of the object 210. In addition, the phase error of the output signal may have a phase shift π in accordance with the bin number of the angle peak bin. The number of the phase shift π depends on the number N of the plurality of antennas to be used. The total number of the phase shift π in the case in which the rectangular window is used is N–1. The phase error subject to the sinusoidal function only depends on the angle θ of the object 210, and does not depend on the distance R of the object 210. On the other hand, the phase shift π from which the angle θ occurs depends on the distance R of the object 210.

Figure 6B:
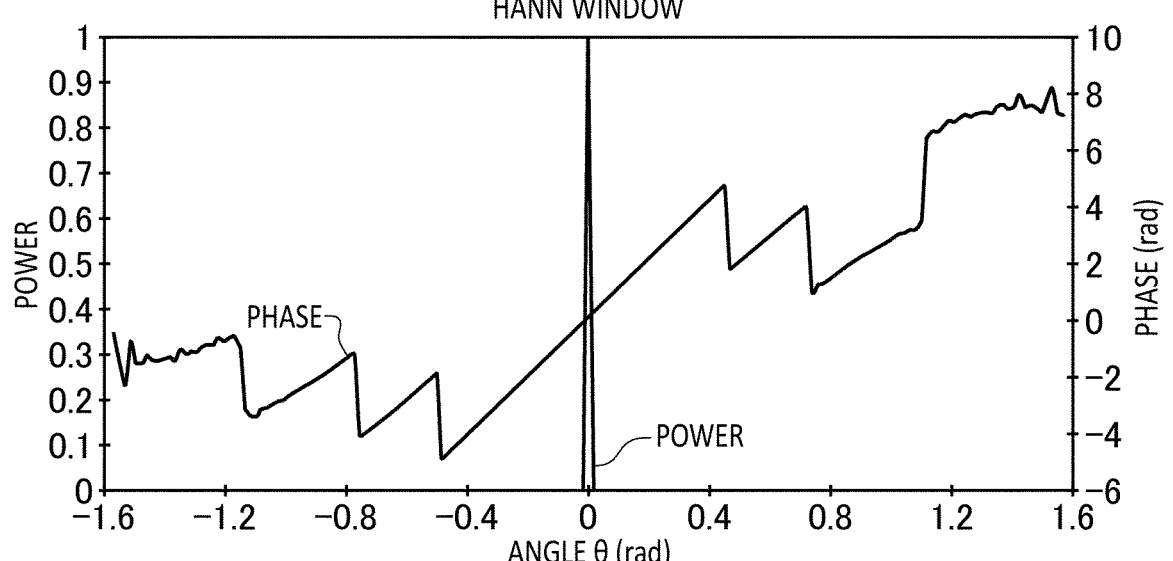
FIG. 6B illustrates an example of a relationship between signal power and a phase with respect to a bin number.

FIG. 6B illustrates an example of a relationship between signal power and a phase with respect to a bin number. The data processing unit 410 of the present example uses the Hann window as the window function. When a Hann window is used as the window function, the phase shift π shifts further apart from an actual target position compared to a case in which the rectangular window is used.

Figure 6C:
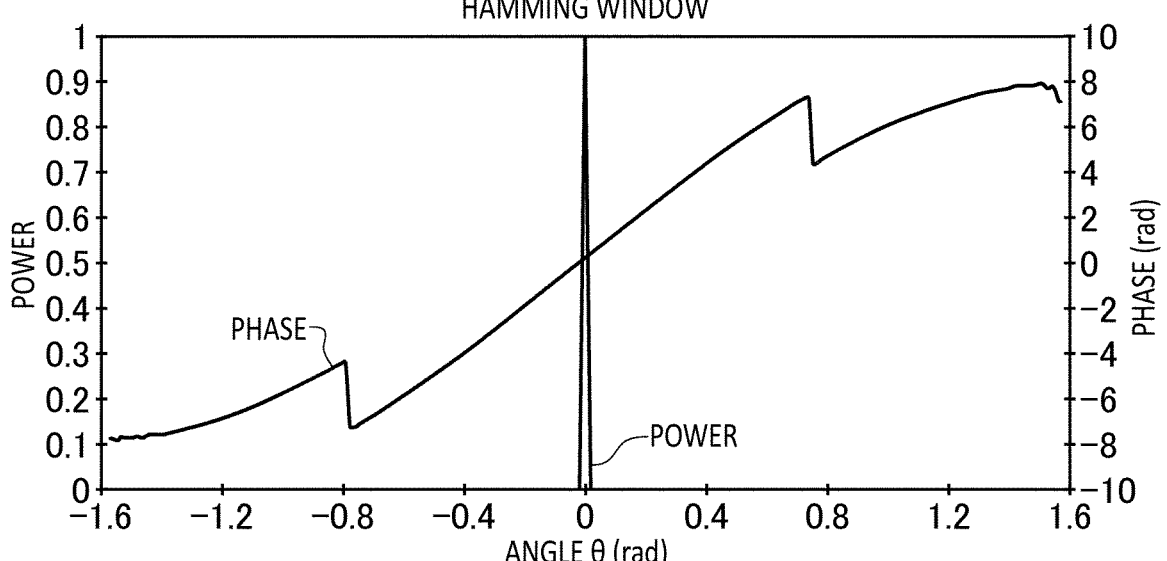
FIG. 6C illustrates an example of a relationship between signal power and a phase with respect to a bin number.

FIG. 6C illustrates an example of a relationship between signal power and a phase with respect to a bin number. The data processing unit 410 of the present example uses the Hamming window as the window function. When a Hamming window is used as the window function, the phase shift π shifts further apart from an actual target position compared to a case in which the Hann window is used. In addition, the number of the phase shift π decreases by two.

Figure 6D:
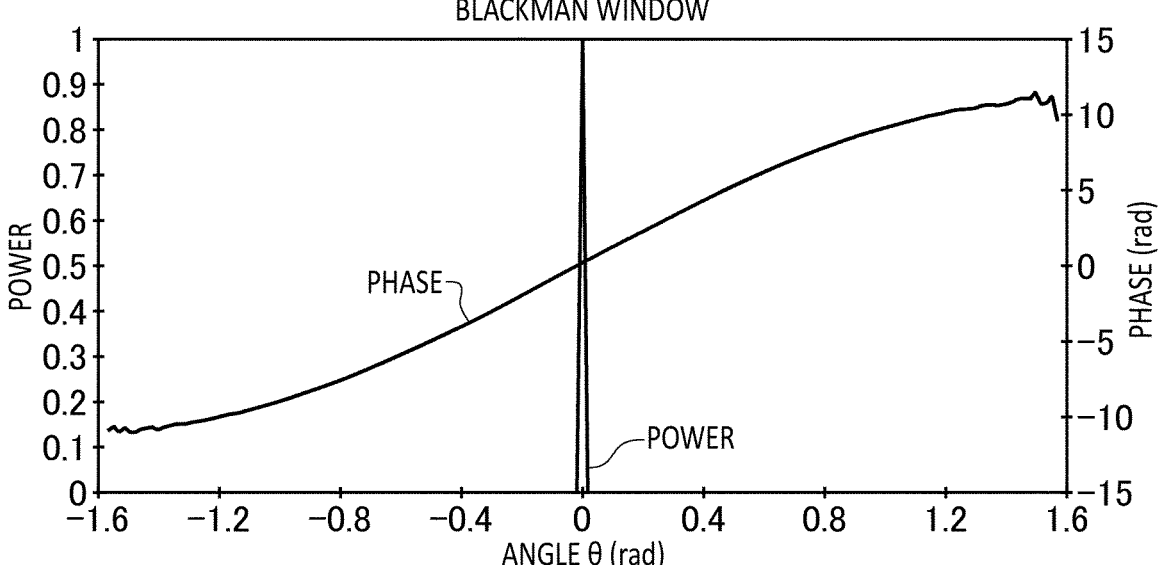
FIG. 6D illustrates an example of a relationship between signal power and a phase with respect to a bin number.

FIG. 6D illustrates an example of a relationship between signal power and a phase with respect to a bin number. The data processing unit 410 of the present example uses the Blackman window as the window function. When a Blackman window is used as the window function, the phase shift π shifts further apart from an actual target position compared to a case in which the Hamming window is used. In addition, the number of the phase shift π decreases by two.

As described above, in the case of a window function other than the rectangular window, the phase shift π shifts further apart from an actual target position than in the case of the rectangular window. In addition, the higher the order of the window function, the less the phase shift generated.

Note that the information processing apparatus 500 easily identifies a position of a bin in which the object 210 exists even if the object 210 is moved, by using a window function higher in order than that of the rectangular window. When a plurality of objects 210 exist, an optimal window function may be appropriately selected in accordance with the distance between the objects.

Figure 7:
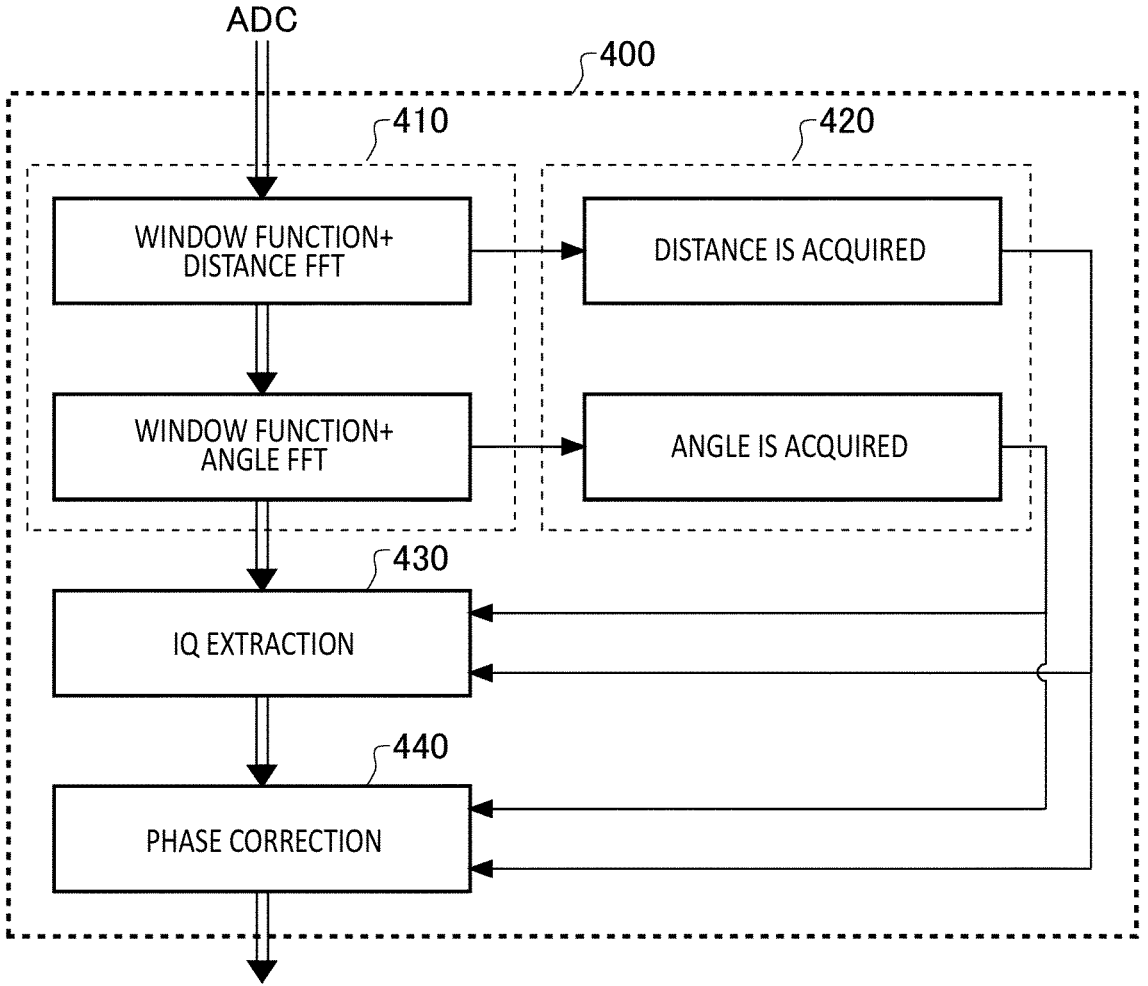
FIG. 7 illustrates a variation of the signal processing unit 400.

FIG. 7 illustrates a variation of the signal processing unit 400. In the present example, points different from those of the example of FIG. 5B will be described in particular. The other points may be the same as those of FIG. 5B. The acquisition unit 420 of the present example outputs, also to the correction unit 440, information related to the acquired distance R, the distance R being a distance from the object 210. The correction unit 440 of the present example may perform both a correction based on a distance acquisition result and a correction based on an angle acquisition result. The description of the correction based on the angle acquisition result is omitted in the present example since it is described in association with FIG. 5B.

The correction unit 440 of the present example corrects the phase of the output signal based on the distance acquisition result obtained after the distance FFT. For example, the correction unit 440 corrects a phase of the distance peak bin of the distance power spectrum in accordance with a bin number of the distance peak bin acquired by the distance FFT. As an example, the correction unit 440 may correct the phase of the output signal so that a difference between the phase to be added or subtracted to or from an odd bin number and the phase to be added or subtracted to or from an even bin number is $(2 \times j + 1) \pi$[rad]. j may be any integer.

Figure 8A:
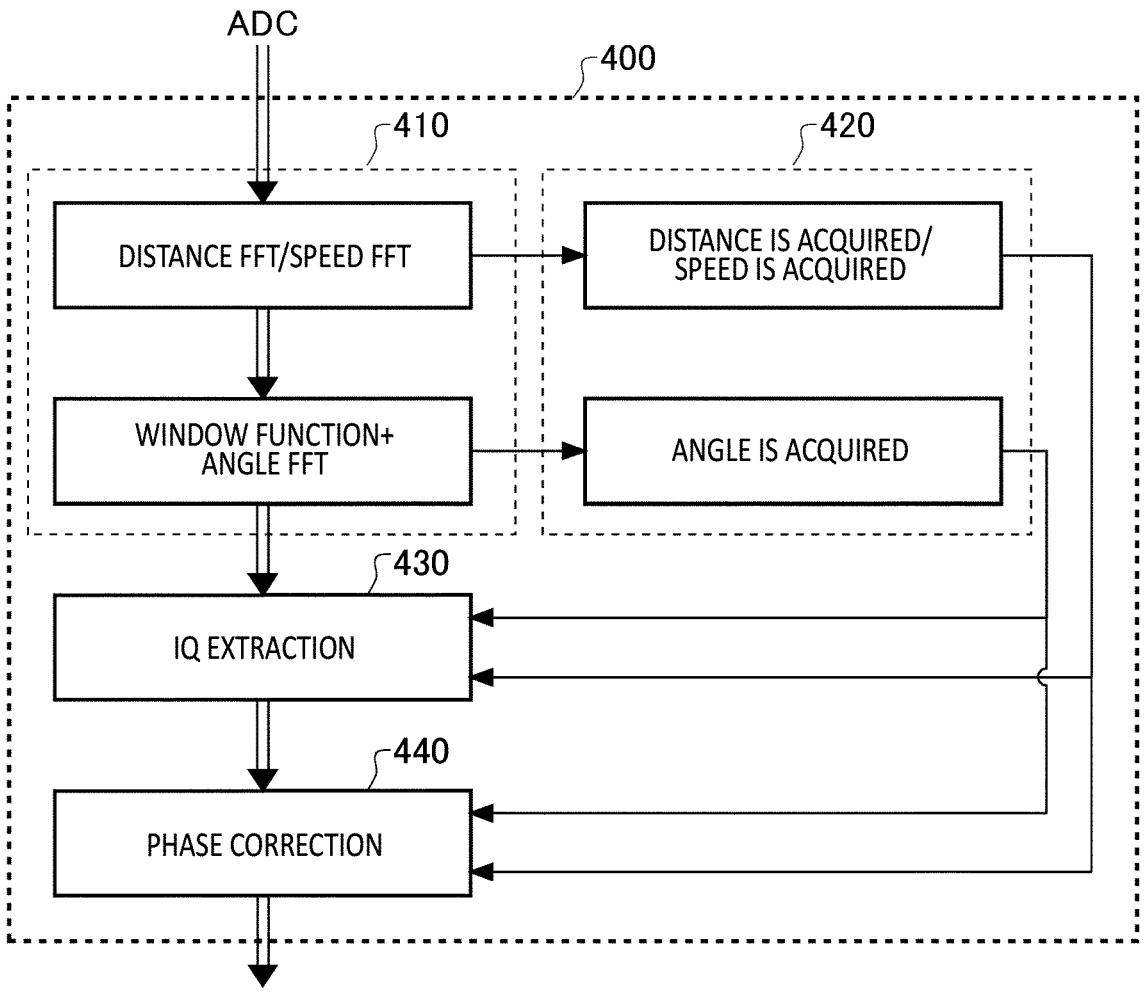
FIG. 8A illustrates a variation of the signal processing unit 400.

FIG. 8A illustrates a variation of the signal processing unit 400. In the present example, points different from those of the example of FIG. 5B will be described in particular. The other points may be the same as those of FIG. 5B. The data processing unit 410 of the present example performs the speed FFT in addition to the distance FFT and the angle FFT, respectively.

The data processing unit 410 acquires a speed power spectrum by performing the speed FFT on the received signal. In addition, the data processing unit 410 acquires an angle power spectrum by performing the angle FFT on the received signal. The data processing unit 410 of the present example performs, after performing the distance FFT, the speed FFT, and the angle FFT based on a data sequence corresponding to a distance peak bin position identified by the distance FFT.

The acquisition unit 420 acquires a peak bin related to the speed V in addition to the distance R and the angle θ of the object 210. The acquisition unit 420 acquires a speed peak bin indicating the speed V of the object 210 based on the speed power spectrum. The acquisition unit 420 of the present example acquires the speed peak bin in the speed FFT based on a data sequence corresponding to a distance peak bin position identified by the distance FFT. In this manner, speed V of any object 210 that is selected in accordance with the distance R can be acquired.

The extraction unit 430 extracts respective IQ data based on the peak bins indicating the distance R, the speed V, and the angle θ of the object 210. The extraction unit 430 of the present example extracts the IQ data from the speed V and the angle θ of the bin corresponding to the distance peak bin of the distance R of the object 210. The extraction unit 430 may extract the IQ data directly or may extract the IQ data by using another algorithm such as compressed sensing.

The correction unit 440 performs a phase correction algorithm based on the IQ data extracted from at least one of the distance R, the speed V, or the angle θ extracted by the extraction unit 430. For example, the correction unit 440 corrects the phase of the output signal of each of the distance R, the speed V, and the angle θ based on the IQ data extracted from the distance R, the speed V, and the angle θ of the object 210.

The information processing apparatus 500 of the present example can output the output signal having the phase of each of the distance R, the speed V, and the angle θ corrected. The information processing apparatus 500 may correct only the phase of any one output signal of the distance R, the speed V, or the angle θ.

Figure 8B:
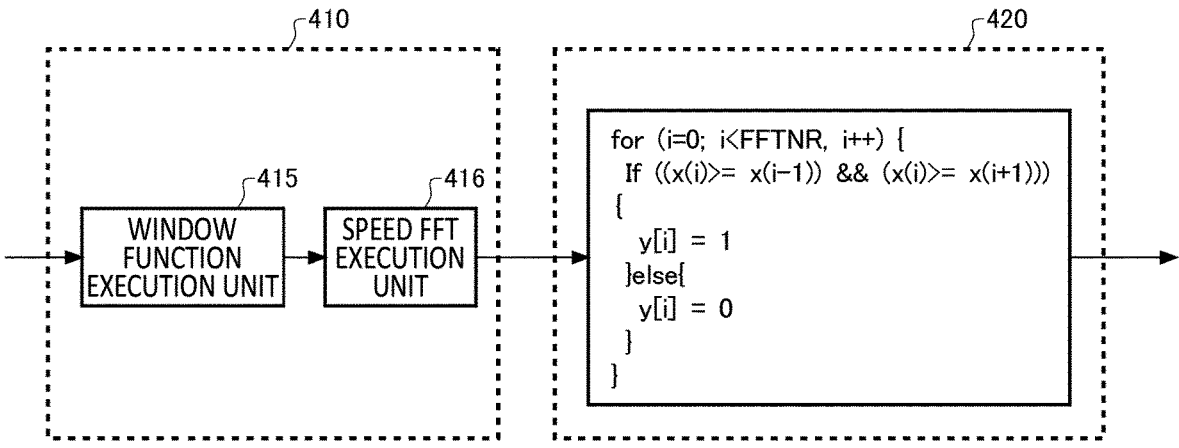
FIG. 8B is a drawing for describing a more detailed configuration of the data processing unit 410 and the acquisition unit 420.

FIG. 8B is a drawing for describing a more detailed configuration of a data processing unit 410 and an acquisition unit 420. In the present example, a process related to the speed FFT is described. The data processing unit 410 of the present example has a window function execution unit 415 and a speed FFT execution unit 416.

The window function execution unit 415 performs a predetermined window function to cut out a signal that has been input. The speed FFT execution unit 416 converts the signal that is cut out by the window function execution unit 415 into a speed power spectrum of a frequency domain by performing speed FFT processing thereto.

In the present example, after the window function execution unit 415 cuts out the digital received signal, the speed FFT execution unit 416 performs the speed FFT to convert the signal that is cut out into a speed power spectrum in a frequency domain. However, the order of the FFT processing and the window function processing is not limited thereto. After the speed FFT execution unit 416 converts the signal that is cut out into the speed power spectrum, the window function execution unit 415 may cut out the signal. A CAPON method or another algorithm such as compressed sensing may be used for the spectrum conversion.

The acquisition unit 420 detects a peak position indicating speed V of the object 210, by using a predetermined detection algorithm, from the power spectrum signal of the frequency domain that is output by the speed FFT execution unit 416. The acquisition unit 420 may acquire a peak position by a simple peak detection algorithm or may acquire the peak position by using another algorithm such as a CFAR algorithm. The acquisition unit 420 outputs, to the extraction unit 430 and the correction unit 440, a speed peak bin corresponding to the speed V of the object 210 that is acquired.

Figure 9A:
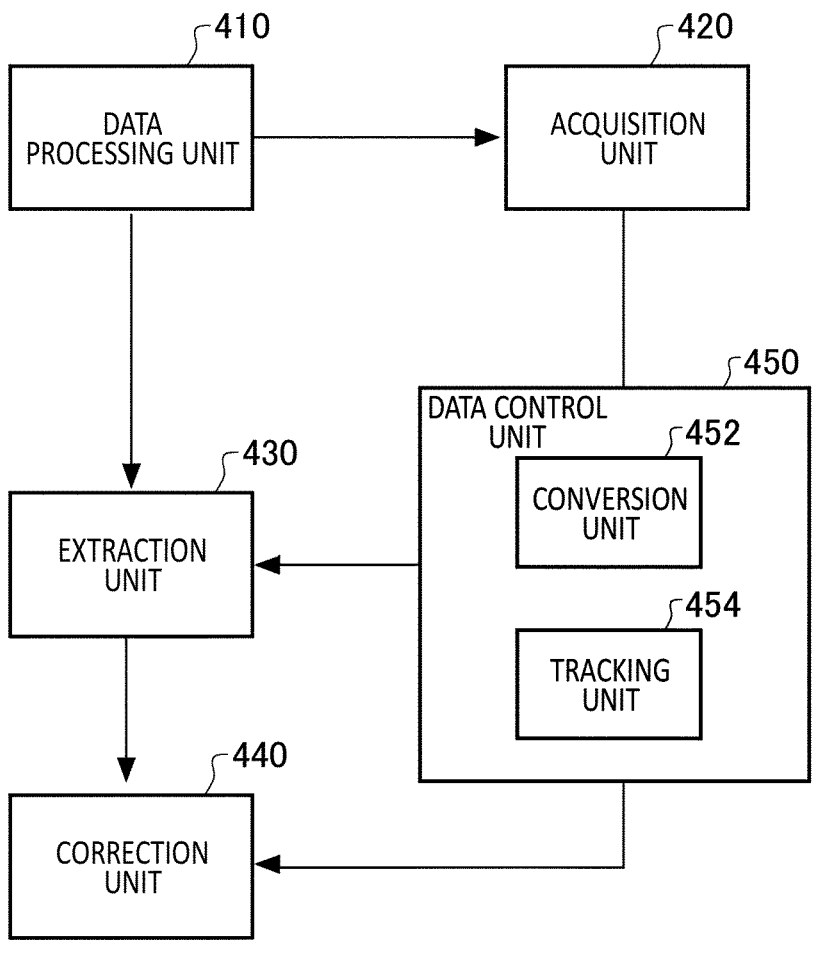
FIG. 9A illustrates a variation of the signal processing unit 400.

FIG. 9A illustrates a variation of the signal processing unit 400. In the present example, points different from those of the example of FIG. 8A will be described in particular. The other points may be the same as those of FIG. 8A. The signal processing unit 400 in the present example has a data control unit 450. The data control unit 450 has a data conversion unit 452 and a tracking unit 454.

The data conversion unit 452 converts a plurality of data corresponding to the object 210 acquired by the acquisition unit 420 into clustered data. For example, when a plurality of detection points that may belong to the same object 210 are generated, the data conversion unit 452 replaces the plurality of detection points corresponding to the object 210 with one detection point. In this manner, the information processing apparatus 500 can cluster a group corresponding to the same object 210 at one detection point to simplify the process.

The tracking unit 454 tracks the object 210 based on past data of the object 210 when data corresponding to the object 210 is not obtained in a predetermined period. Even if the object 210 could not be detected in a process within a predetermined time and missing data occurred in detecting a vibration of the object 210, the tracking unit 454 can complement the data of the object 210 by using a tracking algorithm. In this manner, the information processing apparatus 500 can predict the position of the object 210 even if there is no measured data obtained within the predetermined time.

In the present example, the process in the extraction unit 430 and the correction unit 440 can be simplified since the data clustered by the data control unit 450 is output to the extraction unit 430 and the correction unit 440. In addition, the missing data can be avoided in the extraction unit 430 and the correction unit 440 since the data tracked by the data control unit 450 is output to the extraction unit 430 and the correction unit 440.

Figure 9B:
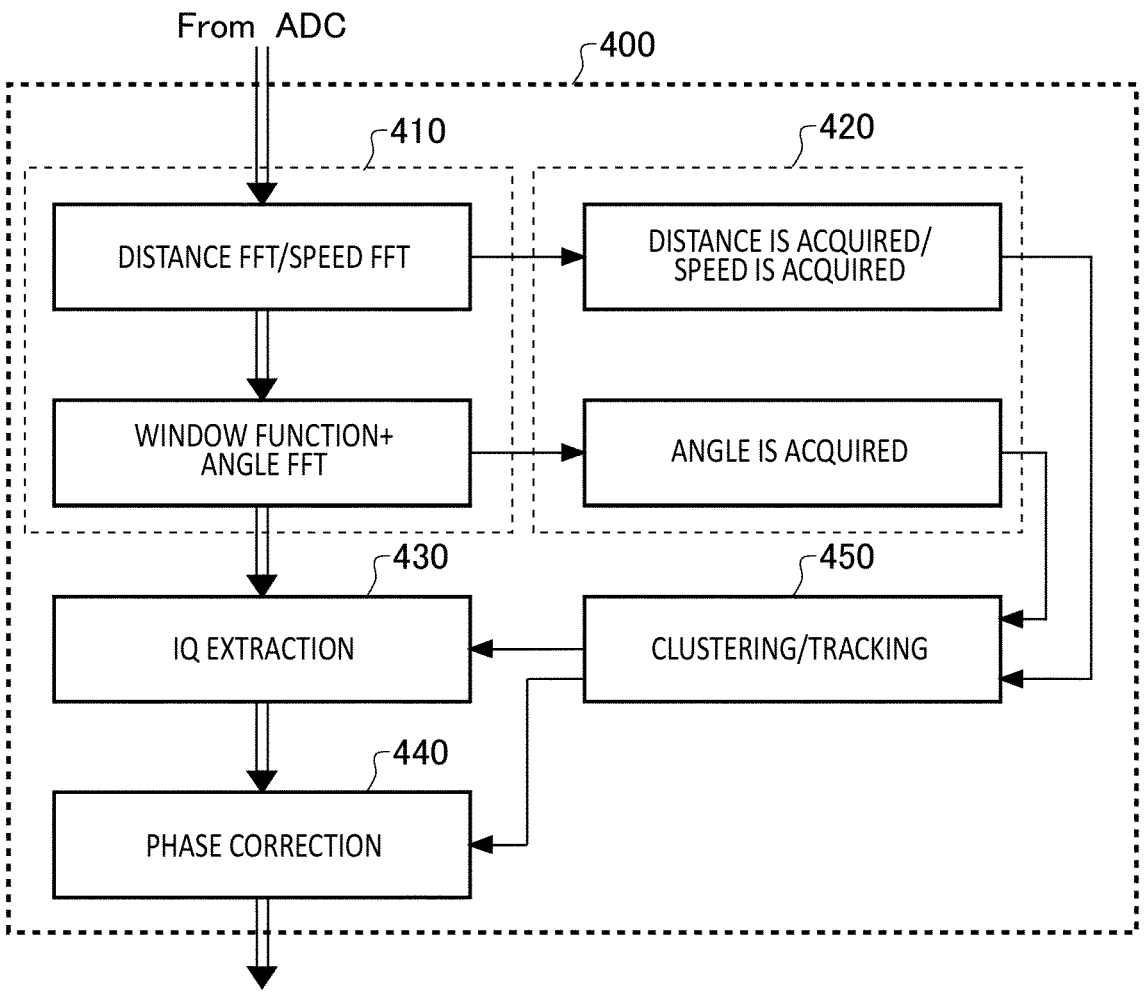
FIG. 9B illustrates an example of the operation of the signal processing unit 400.

FIG. 9B illustrates an example of the operation of the signal processing unit 400. The data control unit 450 may perform a clustering process or a tracking process for a detection point corresponding to at least one of the distance R, the speed V, or the angle θ of the object 210. The data control unit 450 outputs the processed data to the extraction unit 430 and the correction unit 440, respectively.

Figure 9C:
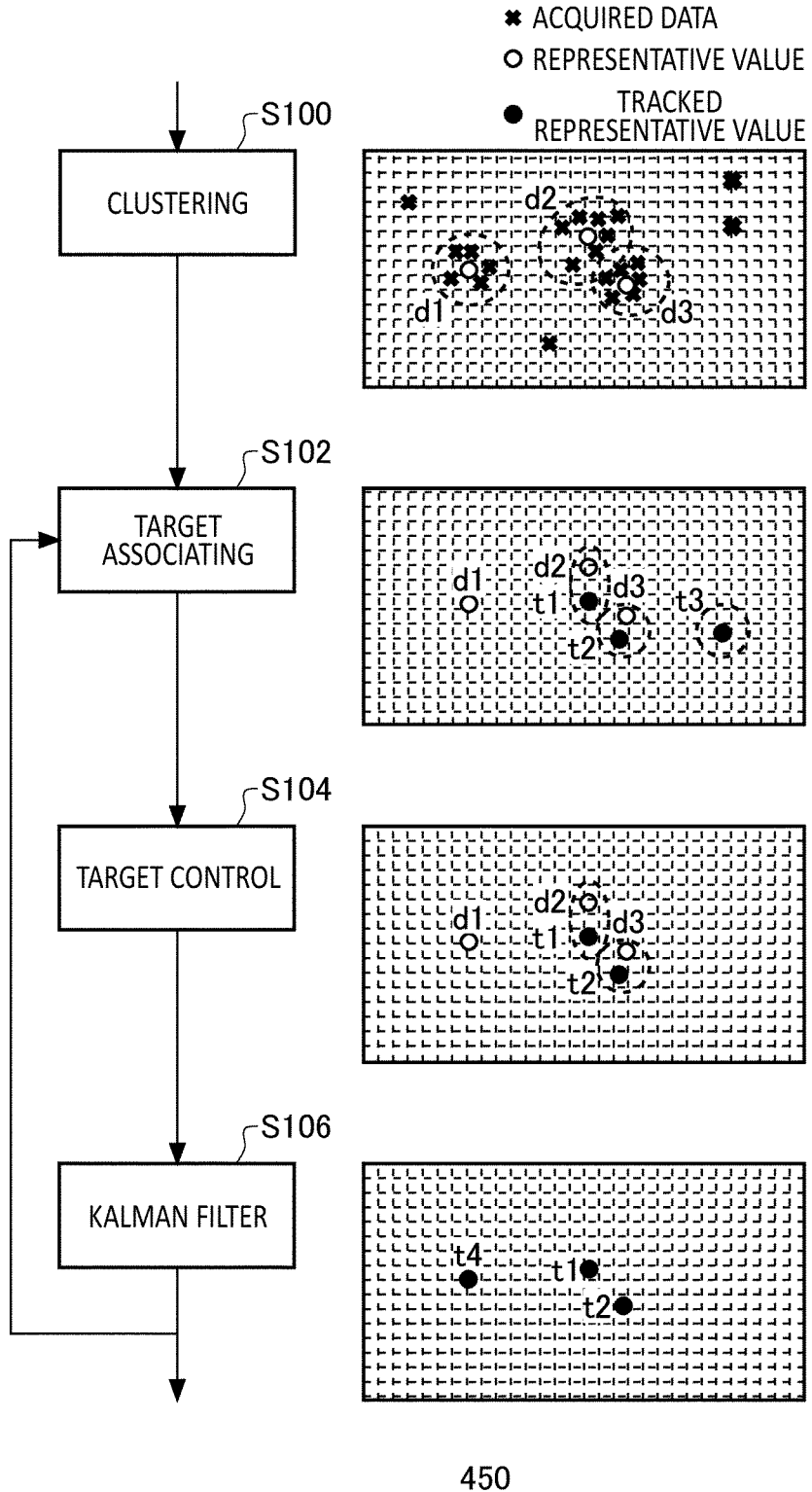
FIG. 9C illustrates an example of a data conversion by a data control unit 450.

FIG. 9C illustrates an example of a data conversion by a data control unit 450. The data conversion method in the present example is an example, and not limited thereto.

In step S100, the data control unit 450 clusters acquired data acquired by the acquisition unit 420. For example, each of the acquired data is clustered into each cluster in accordance with a distribution of the acquired data. The data control unit 450 of the present example clusters the acquired data into three clusters. The data control unit 450 sets representative values d1-d3 representative of each cluster. The representative value may be a value near the center of the distribution of the cluster.

In step S102, calculated representative values are associated with tracked past representative values t1 to t3, to form a pair of a new representative value and a past representative value. In the present example, the representative value d2 is associated with the past representative value t1, and the representative value d3 is associated with the past representative value t2.

In step S104, the data control unit 450 manages a target, to link a correct ID to the associated data.

Since there is no representative value corresponding to the representative value d1, a new ID is provided as a new object 210. The representative values d2 and d3 can be associated with an ID corresponding to the object 210 since past representative values t1 and t2 which are tracked exist. The past representative value t3 is removed since there is no representative value corresponding to the current representative value.

In step S106, the Kalman filter performs filtering. In the present example, there are newly tracked representative values t1, t2, and t4. The representative values t1 and t2 continue to exist as the tracked representative values. The representative value t4 is tracked as a new representative value based on the representative value d1. The tracked representative values t1, t2, and t4 may be used for the target association in step S102.

Note that the adjacent bin may be selected by the detection algorithm or the tracking algorithm. Even if the adjacent bin is selected and a phase shift occurs, the information processing apparatus 500 can compensate for the phase shift of the output signal.

Figure 10:
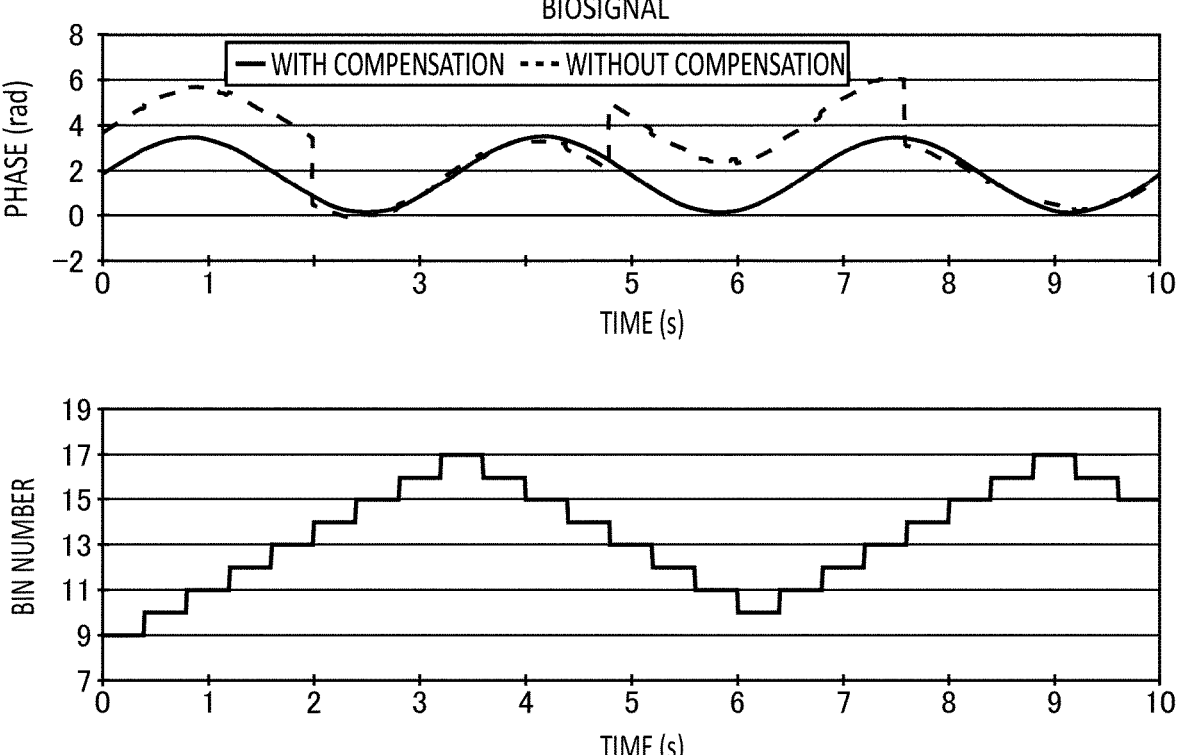
FIG. 10 illustrates an example of a phase compensation result by the information processing apparatus 500.

FIG. 10 illustrates an example of a phase compensation result by the information processing apparatus 500. Compared to a case in which a phase compensation is not performed, the information processing apparatus 500 can remove a phase discontinuity by compensating for the phase. The correction unit 440 in the present example corrects a phase of several angle peak bins when the angle peak bin changes in a range from the bin number 9 to 17. Note that the bin number to be phase-corrected is not limited thereto.

The information processing apparatus 500 can compensate for the phase shift as a result of the movement of the object 210, and sense the object 210 more precisely over time. The information processing apparatus 500 can be used in various fields since it can detect a little body motion of the object 210 in a contactless manner. The information processing apparatus 500 can be applied to a medical field for detecting a biosignal such as heartbeat or breathing. In addition, the information processing apparatus 500 may be used to sense a vibration of a structure such as a building or a bridge or the like to sense a defect, or may be used to sense a vibration of a motor or the like.

While the present invention has been described by way of the embodiments, the technical scope of the present invention is not limited to the above-described embodiments. It is apparent to persons skilled in the art that various alterations or improvements can be made to the above-described embodiments. It is also apparent from the description of the claims that the embodiments to which such alterations or improvements are made can be included in the technical scope of the present invention.

It should be noted that the operations, procedures, steps, stages, and the like of each process performed by an apparatus, system, program, and method shown in the claims, specification, or drawings can be realized in any order as long as the order is not indicated by "prior to," "before," or the like and as long as the output from a previous process is not used in a later process. Even if the operation flow is described using phrases such as "first" or "next" for the sake of convenience in the claims, specification, or drawings, it does not necessarily mean that the process must be performed in this order.

EXPLANATION OF REFERENCES 38 data cube
100 transceiving unit
120 transmission unit
140 reception unit
150 beat signal
160 transmission and reception control unit
210 object
220 transmitted wave
230 received wave
300 input unit
400 signal processing unit
410 data processing unit
411 window function execution unit
412 distance FFT execution unit
413 window function execution unit
414 angle FFT execution unit
415 window function execution unit
416 speed FFT execution unit
420 acquisition unit
430 extraction unit
440 correction unit
441 phase selection unit
442 rotation unit
443 phase conversion unit
444 addition/subtraction unit
450 data control unit
452 data conversion unit
454 tracking unit
500 information processing apparatus
600 system.

What is claimed is:

1. An information processing apparatus which senses an object by using an FMCW radar, comprising:

a data processing unit which generates a power spectrum signal with a predetermined number of bins by processing a received signal of a plurality of antennas derived from a received wave of the FMCW radar, wherein the data processing unit acquires an angle power spectrum related to an angle with the object by performing angle FFT on the received signal;

an acquisition unit which acquires a plurality of peak bins corresponding to the object based on the power spectrum signal, wherein the acquisition unit acquires an angle peak bin indicating an angle with the object based on the angle power spectrum;

an extraction unit which extracts an output signal corresponding to the power spectrum signal; and a correction unit which corrects a phase of the output signal in accordance with a bin number of the plurality of peak bins, wherein the data processing unit applies a window function higher in order than a window function of a rectangular window when performing the angle FFT on the received signal, the correction unit corrects the phase of the output signal so that a phase difference to be added or subtracted is $(N-1)/2 \times \pi \times \sin(\theta(i))$ [rad] in accordance with the bin number of the angle peak bin, N is a number of the plurality of antennas, i is the bin number of the angle peak bin, and $\theta(i)$ [rad] is an angle corresponding to the bin number of the angle peak bin.

2. The information processing apparatus according to claim 1, wherein the plurality of peak bins include a peak bin of a predetermined first bin number, and a peak bin of a second bin number which is different from the first bin number, and the correction unit corrects a phase of the peak bin of the second bin number without correcting a phase of the peak bin of the first bin number.

3. The information processing apparatus according to claim 2, wherein the data processing unit acquires a distance power spectrum related to a distance from the object by performing distance FFT on the received signal; and applies a window function higher in order than a window function of a rectangular window when performing the distance FFT on the received signal; and wherein the acquisition unit acquires a distance peak bin indicating the distance from the object based on the distance power spectrum.

4. The information processing apparatus according to claim 3, wherein the acquisition unit acquires the angle peak bin in the angle FFT based on a data sequence corresponding to a position of the distance peak bin identified by the distance FFT.

5. The information processing apparatus according to claim 3, wherein the correction unit corrects a phase of the output signal in accordance with the bin number of the distance peak bin.

6. The information processing apparatus according to claim 3, wherein the data processing unit:

acquires the distance power spectrum by performing the distance FFT on the received signal to which a first window function is applied; and acquires the angle power spectrum by performing the angle FFT on the received signal to which a second window function that is different from the first window function is applied; and wherein the second window function is a window function higher in order than a window function of the first window function.

7. The information processing apparatus according to claim 2, wherein the data processing unit acquires a speed power spectrum related to speed of the object by performing speed FFT on the received signal; and the acquisition unit acquires a speed peak bin indicating the speed of the object based on the speed power spectrum.

8. The information processing apparatus according to claim 7, wherein the acquisition unit acquires the speed peak bin in the speed FFT based on a data sequence corresponding to a distance peak bin position identified by distance FFT.

9. The information processing apparatus according to claim 2, comprising a data conversion unit which converts a plurality of data corresponding to the object into clustered data.

10. The information processing apparatus according to claim 1, wherein the data processing unit:

acquires a distance power spectrum related to a distance from the object by performing distance FFT on the received signal; and applies a window function higher in order than a window function of a rectangular window when performing the distance FFT on the received signal; and wherein the acquisition unit acquires a distance peak bin indicating the distance from the object based on the distance power spectrum.

11. The information processing apparatus according to claim 10, wherein the acquisition unit acquires the angle peak bin in the angle FFT based on a data sequence corresponding to a position of the distance peak bin identified by the distance FFT.

12. The information processing apparatus according to claim 10, wherein the correction unit corrects a phase of the output signal in accordance with the bin number of the distance peak bin.

13. The information processing apparatus according to claim 10, wherein the data processing unit:

acquires the distance power spectrum by performing the distance FFT on the received signal to which a first window function is applied; and acquires the angle power spectrum by performing the angle FFT on the received signal to which a second window function that is different from the first window function is applied; and wherein the second window function is a window function higher in order than a window function of the first window function.

14. The information processing apparatus according to claim 1, wherein the data processing unit acquires a speed power spectrum related to speed of the object by performing speed FFT on the received signal; and the acquisition unit acquires a speed peak bin indicating the speed of the object based on the speed power spectrum.

15. The information processing apparatus according to claim 14, wherein the acquisition unit acquires the speed peak bin in the speed FFT based on a data sequence corresponding to a distance peak bin position identified by distance FFT.

16. The information processing apparatus according to claim 1, comprising a data conversion unit which converts a plurality of data corresponding to the object into clustered data.

17. The information processing apparatus according to claim 1, comprising a tracking unit which tracks the object based on past data of the object when data corresponding to the object is not obtained in a predetermined period.

18. The information processing apparatus according to claim 1, wherein the extraction unit extracts IQ data including an in-phase component and a quadrature component that is orthogonal to the in-phase component from the peak bin acquired by the acquisition unit.

19. The information processing apparatus according to claim 1, wherein the data processing unit:

processes the received signal by using a CAPON method or an algorithm of compressed sensing; and applies a window function higher in order than a window function of a rectangular window when performing the CAPON method or the algorithm of compressed sensing on the received signal.

20. A sensing method for sensing an object by using an FMCW radar, comprising:

generating a power spectrum signal with a predetermined number of bins by processing a received signal of a plurality of antennas derived from a received wave of the FMCW radar, wherein an angle power spectrum related to an angle with the object is generated by performing angle FFT on the received signal;

acquiring a plurality of peak bins corresponding to the object based on the power spectrum signal, wherein an angle peak bin indicating an angle with the object is acquired based on the angle power spectrum;

extracting an output signal corresponding to the power spectrum signal; and correcting a phase of the output signal in accordance with a bin number of the plurality of peak bins, wherein the generating the power spectrum signal includes applying a window function higher in order than a window function of a rectangular window when performing the angle FFT on the received signal, the correcting the phase of the output signal includes correcting the phase of the output signal so that a phase difference to be added or subtracted is $(N-1)/2 \times \pi \times \sin(\theta(i))$ [rad] in accordance with the bin number of the angle peak bin, N is a number of the plurality of antennas, i is the bin number of the angle peak bin, and $\theta(i)$ [rad] is an angle corresponding to the bin number of the angle peak bin.

* * * * *